(12) United States Patent
Bieberich et al.

(10) Patent No.: US 8,801,282 B2
(45) Date of Patent: *Aug. 12, 2014

(54) CONSTRUCTIONS FOR ZERO-HEAT-FLUX, DEEP TISSUE TEMPERATURE MEASUREMENT DEVICES

(75) Inventors: Mark T. Bieberich, Edina, MN (US); Gary L. Hansen, Eden Prairie, MN (US); Ryan J. Staab, Minneapolis, MN (US); Albert P. Van Duren, Chaska, MN (US); Allen H. Ziaimehr, Arden Hills, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,266

(22) Filed: Sep. 13, 2012

(65) Prior Publication Data

US 2013/0010828 A1   Jan. 10, 2013

Related U.S. Application Data

(63) Continuation of application No. 12/798,670, filed on Apr. 7, 2010, now Pat. No. 8,292,502.

(51) Int. Cl.
*G01K 7/00* (2006.01)
(52) U.S. Cl.
USPC ................................ 374/163; 374/1; 374/208
(58) Field of Classification Search
USPC .............. 374/1, 163, 164, 166, 208, E17.001, 374/141; 600/549
See application file for complete search history.

(56) References Cited

U.S. PATENT DOCUMENTS

| 1,363,259 | A | 12/1920 | Mills |
| 1,526,641 | A | 2/1925 | Mulvany et al. |
| 1,528,383 | A | 3/1925 | Schmidt |

(Continued)

FOREIGN PATENT DOCUMENTS

| CA | 2538940 | 6/2006 |
| CA | 2583034 | 9/2007 |

(Continued)

OTHER PUBLICATIONS

Fox RH, et al, A new technique for monitoring the deep body temperature in man from the intact skin surface. *J. Physiol.* 1971; 212(2): 8P-10P.

(Continued)

*Primary Examiner* — Richard A Smith
*Assistant Examiner* — Tania Courson
(74) *Attorney, Agent, or Firm* — X. Christina Huang

(57) ABSTRACT

The invention pertains to flexible devices used for zero-heat-flux, deep tissue temperature measurement, especially to disposable temperature measurement devices. Such a device is constituted of a flexible substrate. An electrical circuit is disposed on a side of the substrate. The electrical circuit includes first and second thermal sensors disposed, respectively, on first and second substrate layers. A heater trace is disposed on the first substrate layer with the first thermal sensor. The first and second substrate layers are separated by a flexible layer of insulation disposed between the first and second substrate layers. The heater trace defines a heater with a central portion that operates with a first power density and a peripheral portion around the central portion that operates with a second power density greater than the first power density.

22 Claims, 19 Drawing Sheets

(56) References Cited

U.S. PATENT DOCUMENTS

| | | | |
|---|---|---|---|
| 1,638,943 A | 8/1927 | Little | |
| 2,378,804 A | 6/1945 | Sparrow et al. | |
| 2,381,819 A | 8/1945 | Graves et al. | |
| 2,519,785 A | 8/1950 | Okolicsanyi | |
| 2,629,757 A | 2/1953 | McKay | |
| 2,807,657 A | 9/1957 | Jenkins at al. | 136/4 |
| 2,969,141 A | 1/1961 | Katzin | 206/16.5 |
| 3,099,575 A | 7/1963 | Hill | 117/212 |
| 3,099,923 A | 8/1963 | Benzinger | 73/341 |
| 3,215,265 A | 11/1965 | Welin-Berger | 206/63.2 |
| 3,235,063 A | 2/1966 | Jarund | 206/16.5 |
| 3,238,775 A | 3/1966 | Watts | 73/190 |
| 3,301,394 A | 1/1967 | Baermann at al | 206/63.2 |
| 3,367,182 A | 2/1968 | Baxter | 73/190 |
| 3,427,209 A | 2/1969 | Hager, Jr. | 136/225 |
| 3,469,685 A | 9/1969 | Baermann | 206/63.2 |
| 3,552,558 A | 1/1971 | Poncy | 206/63.2 |
| 3,581,570 A | 6/1971 | Wortz | 73/355 R |
| 3,607,445 A | 9/1971 | Hines | 136/225 |
| 3,720,103 A | 3/1973 | Adams et al. | 73/190 H |
| 3,767,470 A | 10/1973 | Hines | 136/225 |
| 3,781,749 A | 12/1973 | Iles et al. | 338/25 |
| 3,809,230 A | 5/1974 | Poncy | 206/306 |
| 3,833,115 A | 9/1974 | Schapker | 206/63.2 |
| 3,877,463 A | 4/1975 | Cary et al. | 128/2 H |
| 3,933,045 A | 1/1976 | Fox et al. | 73/359 |
| 3,942,123 A | 3/1976 | Georgi | 328/1 |
| 4,022,063 A | 5/1977 | West et al. | 73/362 |
| 4,024,312 A | 5/1977 | Korpman | 428/343 |
| 4,142,631 A | 3/1979 | Brandriff | 206/306 |
| 4,149,066 A | 4/1979 | Niibe | |
| 4,182,313 A | 1/1980 | Aslan | |
| 4,253,469 A | 3/1981 | Aslan | 128/736 |
| 4,275,741 A | 6/1981 | Edrich | 128/653 |
| 4,347,854 A | 9/1982 | Gosline et al. | 128/736 |
| 4,407,292 A | 10/1983 | Edrich | 128/653 |
| 4,494,550 A | 1/1985 | Blazek et al. | 128/664 |
| 4,539,994 A * | 9/1985 | Baumbach et al. | 600/358 |
| 4,541,734 A | 9/1985 | Ishizaka | 374/169 |
| 4,572,213 A | 2/1986 | Kawahara | 128/736 |
| 4,574,359 A | 3/1986 | Ishizaka et al. | 364/557 |
| 4,577,976 A | 3/1986 | Hayashi et al. | 374/29 |
| 4,592,000 A | 5/1986 | Ishizaka et al. | 364/557 |
| 4,629,336 A | 12/1986 | Ishizaka | 364/557 |
| 4,648,055 A | 3/1987 | Ishizaka et al. | 364/557 |
| 4,652,145 A | 3/1987 | Bjornberg | 374/194 |
| 4,669,049 A | 5/1987 | Kosednar et al. | 364/557 |
| 4,747,413 A | 5/1988 | Bloch | 128/736 |
| 4,841,543 A | 6/1989 | Dittmar et al. | 374/44 |
| 4,859,078 A | 8/1989 | Bowman et al. | 374/44 |
| 4,899,297 A | 2/1990 | Sano et al. | 364/557 |
| 4,955,380 A * | 9/1990 | Edell | 600/355 |
| 4,987,579 A | 1/1991 | Yoshinaka et al. | 377/25 |
| 5,002,057 A | 3/1991 | Brady | 128/652 |
| 5,015,102 A | 5/1991 | Yamaguchi | 374/107 |
| 5,033,866 A | 7/1991 | Kehl et al. | 374/179 |
| 5,040,901 A | 8/1991 | Suzuki | 374/183 |
| 5,050,612 A | 9/1991 | Matsumura | 128/670 |
| 5,062,432 A | 11/1991 | James et al. | 128/736 |
| 5,088,837 A | 2/1992 | Shiokawa et al. | 374/185 |
| 5,149,200 A | 9/1992 | Shiokawa et al. | 374/185 |
| 5,172,979 A | 12/1992 | Barkley et al. | 374/147 |
| 5,178,468 A | 1/1993 | Shiokawa et al. | 374/185 |
| 5,199,436 A | 4/1993 | Pompei et al. | 128/664 |
| 5,255,979 A | 10/1993 | Ferrari | 374/158 |
| 5,263,775 A | 11/1993 | Smith et al. | 374/134 |
| 5,293,877 A | 3/1994 | O'Hara et al. | 128/736 |
| 5,483,190 A | 1/1996 | McGivern | 327/34 |
| 5,516,581 A | 5/1996 | Kreckel et al. | 428/317.3 |
| 5,576,224 A | 11/1996 | Yakura | |
| 5,816,706 A | 10/1998 | Heikkila et al. | 374/134 |
| 5,884,235 A | 3/1999 | Ebert | 702/87 |
| 5,990,412 A | 11/1999 | Terrell | 136/225 |
| 5,993,698 A | 11/1999 | Frentzel et al. | 252/511 |
| 6,001,471 A | 12/1999 | Bries et al. | 428/343 |
| 6,014,890 A | 1/2000 | Breen | 73/29.02 |
| 6,019,507 A | 2/2000 | Takaki | 374/161 |
| 6,059,452 A | 5/2000 | Smith et al. | 374/169 |
| 6,077,228 A * | 6/2000 | Schonberger | 600/549 |
| 6,203,191 B1 | 3/2001 | Mongan | 374/43 |
| 6,220,750 B1 * | 4/2001 | Palti | 374/164 |
| 6,224,543 B1 | 5/2001 | Gammons et al. | 600/124 |
| 6,231,962 B1 | 5/2001 | Bries et al. | 428/317.3 |
| 6,253,098 B1 | 6/2001 | Walker et al. | 600/344 |
| 6,255,622 B1 | 7/2001 | May et al. | 219/209 |
| 6,278,051 B1 | 8/2001 | Peabody | 136/225 |
| 6,280,397 B1 | 8/2001 | Yarden et al. | 600/549 |
| 6,283,632 B1 | 9/2001 | Takaki | 374/161 |
| 6,292,685 B1 | 9/2001 | Pompei | 600/474 |
| 6,312,391 B1 | 11/2001 | Ramadhyani et al. | 600/549 |
| 6,355,916 B1 | 3/2002 | Siefert | 219/494 |
| 6,377,848 B1 | 4/2002 | Garde et al. | 604/20 |
| 6,398,727 B1 | 6/2002 | Bui et al. | 600/300 |
| 6,495,806 B2 | 12/2002 | Siefert | 219/494 |
| 6,501,364 B1 | 12/2002 | Hui | |
| 6,553,243 B2 | 4/2003 | Gurley | 600/340 |
| 6,595,929 B2 | 7/2003 | Stivoric et al. | 600/549 |
| 6,676,287 B1 | 1/2004 | Mathis et al. | 374/1 |
| 6,773,405 B2 | 8/2004 | Fraden et al. | 600/549 |
| 6,827,487 B2 | 12/2004 | Baumbach | 374/164 |
| 6,886,978 B2 * | 5/2005 | Tokita et al. | 374/169 |
| 6,890,096 B2 * | 5/2005 | Tokita et al. | 374/163 |
| 6,929,611 B2 | 8/2005 | Koch | 600/549 |
| 7,059,767 B2 * | 6/2006 | Tokita et al. | 374/163 |
| 7,249,883 B2 * | 7/2007 | Kuroda et al. | 374/110 |
| 7,270,476 B2 | 9/2007 | Tokita et al. | 374/107 |
| 7,284,904 B2 * | 10/2007 | Tokita et al. | 374/163 |
| 7,299,090 B2 | 11/2007 | Koch | 600/547 |
| 7,306,283 B2 | 12/2007 | Howick et al. | 297/180.12 |
| 7,318,004 B2 | 1/2008 | Butterfield | 702/130 |
| 7,322,743 B2 | 1/2008 | Gozloo | |
| 7,354,195 B2 | 4/2008 | Sakano | 374/208 |
| 7,364,356 B2 | 4/2008 | Dicks et al. | 374/121 |
| 7,410,291 B2 | 8/2008 | Koch | 374/163 |
| 7,426,872 B2 | 9/2008 | Dittmar et al. | 73/818 |
| 7,500,780 B2 | 3/2009 | Miki | |
| 7,597,668 B2 | 10/2009 | Yarden | |
| 7,625,117 B2 * | 12/2009 | Haslett et al. | 374/111 |
| 7,632,008 B2 | 12/2009 | Recht | |
| 7,896,545 B2 | 3/2011 | Pan | |
| 7,988,355 B2 | 8/2011 | Gierer | |
| 8,089,245 B2 | 1/2012 | Kato | |
| 8,342,748 B2 * | 1/2013 | Gierer | 374/208 |
| 8,496,377 B2 * | 7/2013 | Harr et al. | 374/163 |
| 2002/0097775 A1 | 7/2002 | Hamouda et al. | 374/29 |
| 2002/0150143 A1 * | 10/2002 | Tokita et al. | 374/163 |
| 2003/0130590 A1 | 7/2003 | Bui et al. | 600/537 |
| 2004/0076215 A1 | 4/2004 | Baumbach | 374/29 |
| 2004/0210280 A1 | 10/2004 | Liedtke | 607/96 |
| 2005/0101843 A1 | 5/2005 | Quinn | |
| 2005/0245839 A1 | 11/2005 | Stivoric et al. | 600/549 |
| 2005/0281314 A1 | 12/2005 | Fraden | |
| 2007/0167859 A1 | 7/2007 | Finneran et al. | 600/546 |
| 2007/0206655 A1 | 9/2007 | Haslett et al. | 374/141 |
| 2007/0282218 A1 | 12/2007 | Yarden | 600/549 |
| 2008/0170600 A1 | 7/2008 | Sattler et al. | 374/163 |
| 2008/0200969 A1 | 8/2008 | Weber | |
| 2009/0129433 A1 | 5/2009 | Zhang et al. | 374/102 |
| 2010/0121217 A1 | 5/2010 | Padiy | |
| 2010/0134122 A1 | 6/2010 | Furumura | |
| 2010/0220766 A1 | 9/2010 | Burgard | |
| 2010/0268113 A1 | 10/2010 | Bieberich | |
| 2010/0268114 A1 | 10/2010 | Van Duren | |
| 2010/0292605 A1 | 11/2010 | Grassl et al. | 600/549 |
| 2011/0051776 A1 | 3/2011 | Bieberich | |
| 2011/0249699 A1 | 10/2011 | Bieberich | |
| 2011/0249701 A1 | 10/2011 | Bieberich | |
| 2012/0289855 A1 | 11/2012 | Bieberich | |
| 2013/0003776 A1 | 1/2013 | Bieberich | |

FOREIGN PATENT DOCUMENTS

| | | | |
|---|---|---|---|
| DE | 3527942 A1 | 2/1987 | G01K 7/00 |
| EP | 0239824 B1 | 5/1992 | G01K 13/00 |

(56) References Cited

FOREIGN PATENT DOCUMENTS

| | | | | |
|---|---|---|---|---|
| GB | 2266771 A | 11/1993 | ............... | G01K 1/18 |
| JP | 55-29794 | 3/1980 | ............... | G01K 1/16 |
| JP | 57-183832 | 12/1982 | ............... | A61B 5/00 |
| JP | H08-211000 | 8/1996 | ............... | G01N 25/00 |
| JP | 2002202205 A | 7/2002 | ............... | G01K 7/00 |
| JP | 2007-212407 A | 8/2007 | ............... | A61B 5/01 |
| JP | 2009-080000 A | 4/2009 | ............... | A61B 5/04 |
| WO | WO 99/60356 A1 | 11/1999 | ............... | G01K 17/00 |
| WO | WO 00/58702 A1 | 10/2000 | ............... | G01K 7/02 |
| WO | WO 01/31305 A1 | 5/2001 | ............... | G01K 7/42 |
| WO | WO 02-066946 | 8/2002 | | |
| WO | WO 2007/060609 A2 | 5/2007 | ............. | A61B 5/040 |
| WO | WO 2008/068665 A1 | 6/2008 | ............... | G01K 1/16 |
| WO | WO 2008/078271 A1 | 7/2008 | ............... | G01K 1/16 |
| WO | WO 2009/141780 A1 | 11/2009 | ............... | G01K 1/16 |
| WO | WO 2010/082102 A2 | 7/2010 | ............... | G01K 1/14 |
| WO | WO 2010/103436 A1 | 9/2010 | ............... | G01K 1/16 |
| WO | WO 2010/116297 A1 | 10/2010 | ............... | G01K 1/14 |
| WO | WO 2010/120360 A1 | 10/2010 | ............. | G01K 13/00 |
| WO | WO 2010/120362 A1 | 10/2010 | ............. | G01K 13/00 |
| WO | WO 2011/025521 A1 | 10/2010 | ............... | G01K 1/16 |
| WO | WO 2011/126543 A1 | 10/2011 | ............. | G01K 13/00 |
| WO | WO 2011/146098 A1 | 11/2011 | ............... | G01K 1/16 |
| WO | WO 2012-112222 | 8/2012 | | |
| WO | WO 2012-154212 | 11/2012 | | |

OTHER PUBLICATIONS

Solman AJ, et al, New thermometers for deep tissue temperature. *Biomedical Engineering* 1973; 8(10): 432-435.

Fox RH, et al, A new method for monitoring deep body temperature from the skin surface. *Clin. Sci.* 1973; 44: 81-86.

Togawa, T, et al, A modified internal temperature measurement device, *Medical and Biological Engineering*, May 1976, pp. 361-364.

Togawa T, Non-invasive deep body temperature measurement. In: Rolfe P (ed) *Non-invasive Physiological Measurements*. 1979; vol. 1: 261-277.

Zhang X, et al, Application of the Heat Flux Meter in Physiological Studies, *J. therm. Biol.*, 1993, vol. 18: 473-476. Yamakage M, et al, Deep temperature monitoring-comparative study between conventional and new developed monitors, *Anesthesiology*, 2002; 96: A501.

Suleman M-I, et al, Insufficiency in a new temporal-artery thermometer for adult and pediatric patients, *Anesth Analg*, 2002; 95: 67-71.

Yamakage M, et al., Evaluation of a newly developed monitor of deep body temperature, *J. Anesth.*, 2002; 16:354-357.

Thurbide, K., Excuse me, but my Band-Aid is beeping, Haslett's smart Band-Aid/University of Calgary, Jul. 18, 2007, pp. 1-2.

Gunga H-C, et al, A non-invasive device to continuously determine heat strain in humans. *J. Ther. Bio.* 2008; 33: 297-307.

Kimberger O, et al., Accuracy and precision of a novel non-invasive core thermometer.*BJA*. 2009; 103(2): 226-231.

Langham GE, et al, Noninvasive temperature monitoring in postanesthesia care units, *Anesthesiology*, 2009, 111; 1:1-7.

Kitamura, K, et al, Development of a new method for the noninvasive measurement of deep body temperature without a heater, *Med. Eng. Phys.*, 2010; 32(1): 1-6. Epub Nov 10, 2009.

Zeiner A, et al, Non-invasive continuous cerebral temperature monitoring in patients treated with mild therapeutic hypothermia: an observational pilot study, Resuscitation, Jul. 2010; 81(7) 861-866. Epub Apr 15. 2010.

International Search Report & Written Opinion, PCT/US2010/001108, Jul. 23, 2010.

International Search Report & Written Opinion, PCT/US2010/001104, Jul. 26, 2010.

International Search Report & Written Opinion, PCT/US2010/002185, Dec. 13, 2010.

International Search Report & Written Opinion, PCT/US2011/000549, Jun. 26, 2011.

International Search Report & Written Opinion, PCT/US2011/000552, Jun. 29, 2011.

\* cited by examiner

CONSTRUCTIONS FOR ZERO-HEAT-FLUX, DEEP TISSUE TEMPERATURE MEASUREMENT DEVICES

PRIORITY

This application is a continuation of U.S. patent application Ser. No. 12/798,670, filed Apr. 7, 2010.

RELATED APPLICATIONS

This application contains material related to the following US patent applications:
U.S. patent application Ser. No. 12/584,108, filed Aug. 31, 2009, now U.S. Pat. No. 8,226,294; and,
U.S. patent application Ser. No. 12/798,668, filed Apr. 7, 2012.

BACKGROUND

The subject matter relates to a temperature device for use in the estimation of deep tissue temperature (DTT) as an indication of the core body temperature of humans or animals. More particularly, the subject matter relates to constructions of zero-heat-flux DTT measurement devices.

Deep tissue temperature measurement is an estimate of the temperature of organs that occupy cavities of human and animal bodies (core body temperature). DTT measurement is desirable for many reasons. For example, maintenance of core body temperature in a normothermic range during the perioperative cycle has been shown to reduce the incidence of surgical site infection; and so it is beneficial to monitor a patient's core body temperature before, during, and after surgery. Of course noninvasive measurement is highly desirable, for the safety and the comfort of a patient, and for the convenience of the clinician. Thus, it is most advantageous to obtain a noninvasive DTT measurement by way of a device placed on the skin.

Noninvasive measurement of DTT by means of a zero-heat-flux device was described by Fox and Solman in 1971 (Fox R H, Solman A J. A new technique for monitoring the deep body temperature in man from the intact skin surface. J. Physiol. January 1971:212(2): pp 8-10). The Fox/Solman system, illustrated in FIG. 1, estimates core body temperature using a temperature measurement device 10 with a controlled heater of essentially planar construction that stops or blocks heat flow through a portion of the skin. Because the measurement depends on the absence of heat flux through the skin area where measurement takes place, the technique is referred to as a "zero heat flux" (ZHF) measurement. Togawa improved the Fox/Solman technique with a DTT measurement device structure that accounted for multidimensional heat flow in tissue. (Togawa T. Non-Invasive Deep Body Temperature Measurement. In: Rolfe P (ed) Non-Invasive Physiological Measurements. Vol. 1. 1979. Academic Press, London, pp. 261-277). The Togawa device, illustrated in FIG. 2, encloses Fox and Solman's ZHF design in a thick aluminum housing with a cylindrical annulus construction that maintains radial temperature uniformity in the face of non-uniform radial heat flow.

The Fox/Solman and Togawa devices utilize heat flux normal to the body to control the operation of a heater that blocks heat flow from the skin through a thermal resistance in order to achieve a desired ZHF condition. This results in a construction that stacks the heater, thermal resistance, and thermal sensors of a ZHF temperature measurement device, which can result in a substantial vertical profile. The thermal mass added by Togawa's cover improves the tissue temperature uniformity of the Fox/Solman design and makes the measurement of deep tissue temperature more accurate. In this regard, since the goal is zero heat flux through the device, the more thermal resistance the better because it increases probe sensitivity. However, the additional thermal resistance adds mass and size, and also increases the time required to reach a stable temperature.

The size, mass, and cost of the Fox/Solman and Togawa devices do not promote disposability. Consequently, they must be sanitized after use, which exposes them to wear and tear and undetectable damage. The devices must also be stored for reuse. As a result, use of these devices raises the costs associated with zero-heat-flux DTT measurement and can pose a significant risk of cross contamination between patients. It is thus desirable to reduce the size and mass of a zero-heat-flux DTT measurement device, without compromising its performance, in order to promote disposability after a single use.

An inexpensive, disposable, zero-heat-flux DTT measurement device is described and claimed in the priority application and illustrated in FIGS. 3 and 4. The device is constituted of a flexible substrate and an electrical circuit disposed on a surface of the flexible substrate. The electrical circuit includes an essentially planar heater which is defined by an electrically conductive copper trace and which surrounds a zone of the surface that is not powered by the heater, a first thermal sensor disposed in the zone, a second thermal sensor disposed outside of the heater trace, a plurality of electrical pads disposed outside of the heater trace, and a plurality of conductive traces connecting the first and second thermal sensors and the heater trace with the plurality of electrical pads. Of course, the flexibility of the substrate permits the measurement device, including the heater, to conform to contours of the body where measurement is made. Sections of the flexible substrate are folded together to place the first and second thermal sensors in proximity to each other. A layer of insulation disposed between the sections separates the first and second thermal sensors. The device is oriented for operation so as to position the heater and the first thermal sensor on one side of the layer of insulation and the second thermal sensor on the other and in close proximity to an area of skin where a measurement is to be taken. As seen in FIG. 4, the layout of the electrical circuit on a surface of the flexible substrate provides a low-profile, zero-heat-flux DTT measurement device that is essentially planar, even when the sections are folded together. Of course, the flexibility of the substrate permits the measurement device, including the heater, to conform to contours of the body where measurement is made.

Operation of the heater of a zero-heat-flux DTT measurement device causes formation of an isothermal channel into tissue under the area of contact between the device and the skin of a subject. The zero-heat-flux DTT measurement is made by way of this isothermal channel. The larger the area of the heater, the larger the isothermal channel and the more deeply it penetrates into the tissue. The isothermal channel generally is at a higher temperature than the tissue which surrounds it, and so heat in the isothermal channel is lost to the surrounding tissue. This loss of heat reduces the size and depth of the isothermal channel.

Design and manufacturing choices made with respect to a zero-heat-flux DTT measurement device can influence the formation of an isothermal channel. Two such design choices relate to heater construction and measurement device size. In this regard, an important measure of heater performance is power density, the amount of power (in watts, for example)

that a heater produces per unit of area (in square centimeters or cm², for example). A convenient expression of power density is watts/cm².

In a zero-heat-flux DTT measurement device, a heater with uniform power density does not generate a uniform temperature across its heat-emitting surface when the device is in contact with a semi-infinite solid, such as tissue. For example, if the circularly-shaped heater in the measurement device of FIG. 3 is invested with uniform power density in a radial direction, the temperature level drops along a radius of the heater in the direction of the periphery when the device is placed on skin. In other words, the heater is cooler near and up to its outer edge than near its center, and the isothermal channel through which core body temperature is measured is narrower than it would be if a uniform temperature were maintained in the radial direction. Consequently, presuming uniform power density, a progressively larger heater, and thus a larger measurement device, is needed to obtain reasonably accurate deep tissue readings when the measurement location moves from the forehead, to the neck, to the sternum. For example, a measurement device according to FIGS. 3 and 4 with a uniform density heater needs a first minimum diameter, for example about 30 mm (707 mm²), to accurately measure core body temperature at the forehead. However, such a uniform-power-density measurement device needs a second, larger, minimum diameter, for example about 40 mm (1257 mm²), for reasonable measurement accuracy on the neck. We have found that a uniform-power-density measurement device with a third minimum diameter, for example about 50 mm (1963 mm²), is too small to obtain reasonable accuracy through the sternum. We also note that Fox and Solman used a 60 mm square (3600 mm²) zero-heat-flux DTT measurement device with a uniform power density for measurement through the sternum.

However, a zero-heat-flux DTT measurement device fabricated in a single size with a uniform-power-density heater that meets performance requirements for the deepest core body temperature measurement might be too large to be used at other measurement sites. Depending on the location, space for taking a core body measurement can be limited, especially if other measurements are made nearby. For example, abdominal or thoracic surgery might require simultaneous measurement of brain activity, blood oxygen, and core body temperature. In such a case, an optimal measurement site for placement of BIS electrodes, an oxygen monitor, and a DTT measurement device would be on the patient's head; preferably the patient's forehead (including the temples) which is convenient to use, nonsterile, visible, and validated for measuring core body temperature. Manifestly, the forehead area available for placement of measurement devices can quickly become limited as the number of different measurements increases. Accordingly, constructions for a disposable, noninvasive, zero-heat-flux DTT measurement device should have a relatively small contact area. However, downward scaling of a uniform-power-density device can reduce the reliability of the temperature measurements produced by a smaller device for at least two reasons: deterioration of the isothermal channel through which DTT is measured and influence of nonpowered areas on temperature uniformity.

Generally, zero-heat-flux DTT measurement requires a heater with the capacity to deliver enough heat to create and maintain an isothermal channel to some required depth. Reduction of the size of the measurement device requires constructions that still deliver enough heat to create the isothermal channel and that do not compromise the uniformity with which the heat is delivered. However, as the size of the heater is reduced, the size and depth of the isothermal channel is reduced, making it more susceptible to being compromised by the effects of multidimensional heat loss in surrounding tissue. This effect can be more pronounced at measurement sites where the core temperature is relatively deep in the body, such as on the sternum.

Reduction of heater size can also increase the effect which nonpowered areas of the measurement device have on the temperature uniformity of the heater. For a measurement device fabricated by metal deposition techniques, the conductive traces for thermal sensors and other electronic elements deliver no heat and occupy areas which are not powered by the heater. In some designs, such unpowered areas penetrate the heater, thereby reducing the temperature uniformity of the measurement device.

Inconsistencies and irregularities in the thermal insulation near the first thermal sensor can influence its operation and cause it to produce faulty readings. As the size of the measurement device is reduced, these inconsistencies and irregularities increasingly compromise the uniformity of the temperature.

Finally, if additional electronic elements are added to a zero-heat-flux DTT measurement device, additional leads and connections must be provided, which increases the total nonpowered area of the device and additionally complicates the heater layout.

SUMMARY

An object of an invention completed in respect of the problems described above is to reduce the influence of multidimensional heat flow in tissue on the operation of a zero-heat-flux DTT measurement device constituted of a flexible substrate and an electrical circuit including a heater defined by a conductive trace which is disposed on a surface of the flexible substrate.

Another object of an invention completed in respect of the problems described above is to reduce the size of a zero-heat-flux DTT measurement device constituted of a flexible substrate and an electrical circuit including a heater defined by a conductive trace which is disposed on a surface of the flexible substrate, without compromising the ability of the device in creating an isothermal channel by which core body temperature is measured.

Another object of an invention completed in respect of the problems described above is to reduce the size of a zero-heat-flux DTT measurement device constituted of a flexible substrate and an electrical circuit including a heater defined by a conductive trace which is disposed on a surface of the flexible substrate, without compromising the uniformity of the temperature generated by the device to create an isothermal zone by which deep tissue temperature is measured.

Another object of an invention completed in respect of the problems described above is to reduce the size of a zero-heat-flux DTT measurement device constituted of a flexible substrate and electrically conductive traces on a surface of the substrate for a heater, at least two thermal sensors, and at least one additional electronic device.

These and other objects are achieved with a zero-heat-flux DTT measurement device constituted of a flexible substrate and an electrical circuit including a heater trace defining a generally planar heater surrounding a zone on a surface of the substrate, in which the heater has a central power density portion and a peripheral power density portion surrounding the central power density portion.

Preferably, the heater trace defines a heater with a central portion that surrounds the zone and has a first power density and a peripheral portion that surrounds the central portion and has a second power density that is greater than the first power density.

Alternatively, the heater trace defines a heater with a central heater element that surrounds the zone and a peripheral heater element around the outer periphery of the central heater element, in which the central and peripheral heater elements are separately controllable.

These and other objects are achieved with a zero-heat-flux DTT measurement device constituted of a flexible substrate and an electrical circuit including a heater trace with a pattern defining an annular heater, in which the heater trace has a power density with a first value in an area where the pattern is uninterrupted and a second value in areas where the pattern is interrupted, wherein the second value is greater than the first value.

These and other objects are achieved with a zero-heat-flux DTT measurement device constituted of a flexible substrate including a center section, a tab extending outwardly from the periphery of the center section, a tail extending outwardly from the periphery of the center section, and an electrical circuit on a surface of the flexible substrate, the electrical circuit including a heater trace defining a heater surrounding a zone of the surface, a first thermal sensor disposed in the zone, a second thermal sensor disposed on the tail, a plurality of electrical pads disposed on the tab, and a plurality of conductive traces connecting the first and second thermal sensors and the heater trace with the plurality of electrical pads, in which the tail and tab are separated so as to provide a path on the surface for the conductive traces connecting the second thermal sensor with electrical pads which is easily routed and does not cross the heater trace.

These and other objects are achieved with a zero-heat-flux DTT measurement device constituted of a flexible substrate and an electrical circuit on a surface of the flexible substrate, the electrical circuit including a heater trace defining a heater surrounding a zone of the surface, a first thermal sensor disposed in the zone, a second thermal sensor disposed outside of the heater, a plurality of electrical pads, and a plurality of conductive traces connecting the first and second thermal sensors and the heater trace with the plurality of electrical pads, in which at least one of the conductive traces is shared by at least two elements of the electrical circuit.

DETAILED DESCRIPTION OF PREFERRED EMBODIMENTS

It is desirable that zero heat flux, deep tissue temperature measurement device constructions contact a minimal area of skin when placed for use, while creating and maintaining a well-formed isothermal channel for reliable, accurate measurement of core body temperature. The constructions should have a low mass and a low profile, and should present a relatively small area which contacts skin in order to make the measurement (hereinafter, this area is referred to as the "contact area" of the device). It is particularly desirable that a low-profile, light weight, flexible DTT measurement device construction enable zero heat flux temperature measurement at more than one site on a human or animal body.

A temperature device for zero-heat-flux DTT measurement includes a flexible substrate with at least two thermal sensors disposed in a spaced-apart relationship and separated by one or more flexible layers of thermally insulating material. Preferably the sensors are maintained in a spaced apart relationship by a flexible thermal (and electrical) insulator. The substrate supports at least the thermal sensors, the separating thermal insulator, and a heater. It is desirable that the substrate also support at least one additional electronic device in order to enrich the functionality of the temperature device.

Although temperature device constructions are described in terms of preferred embodiments comprising representative elements, the embodiments are merely illustrative. It is possible that other embodiments will include more elements, or fewer, than described. It is also possible that some of the described elements will be deleted, and/or other elements that are not described will be added. Further, elements may be combined with other elements, and/or partitioned into additional elements.

A Zero-Heat-Flux DTT Measurement Device

Figure 1:
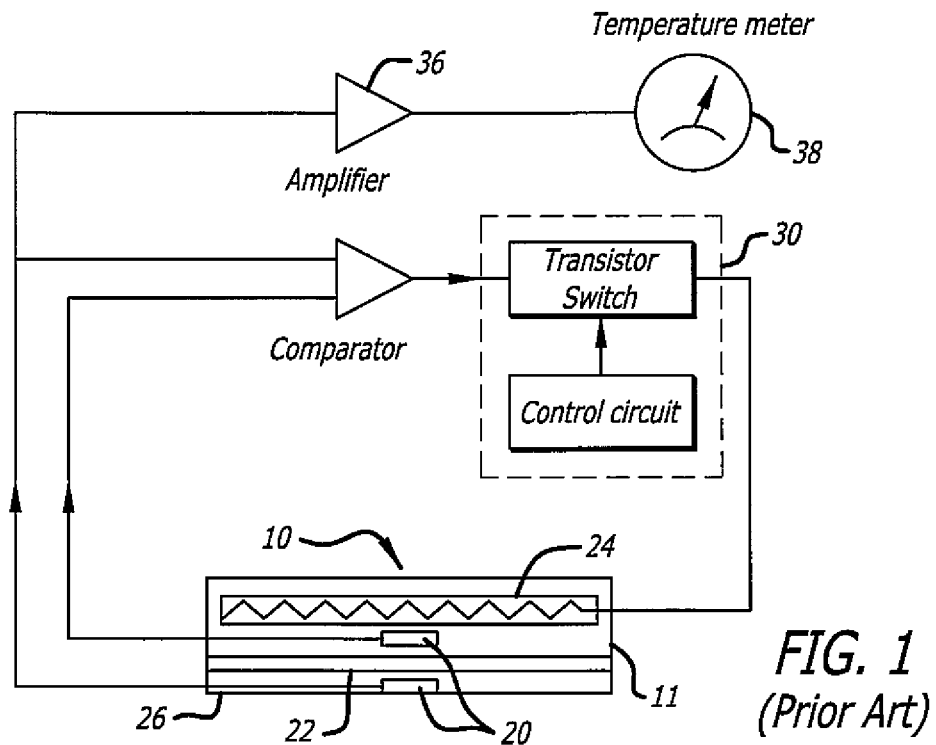
FIG. 1 is a schematic block diagram of a first prior art deep tissue temperature measurement system including a ZHF DTT measurement device.
Figure 2:
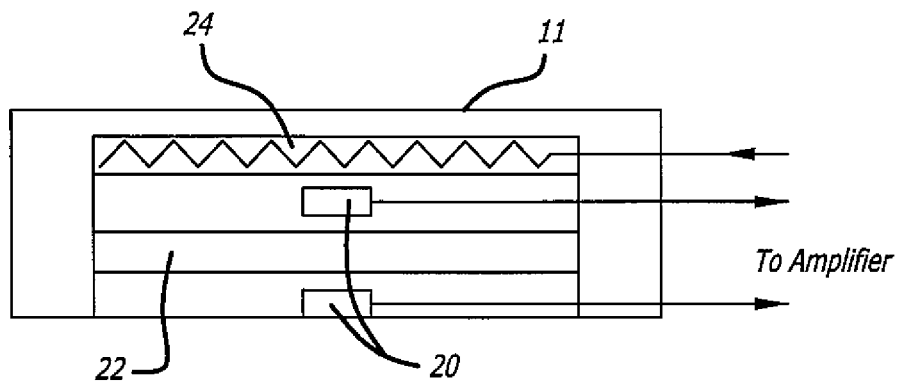
FIG. 2 is a schematic side sectional diagram of a second prior art deep tissue temperature measurement system including a ZHF deep tissue temperature measurement device with an aluminum cap.
Figure 3:
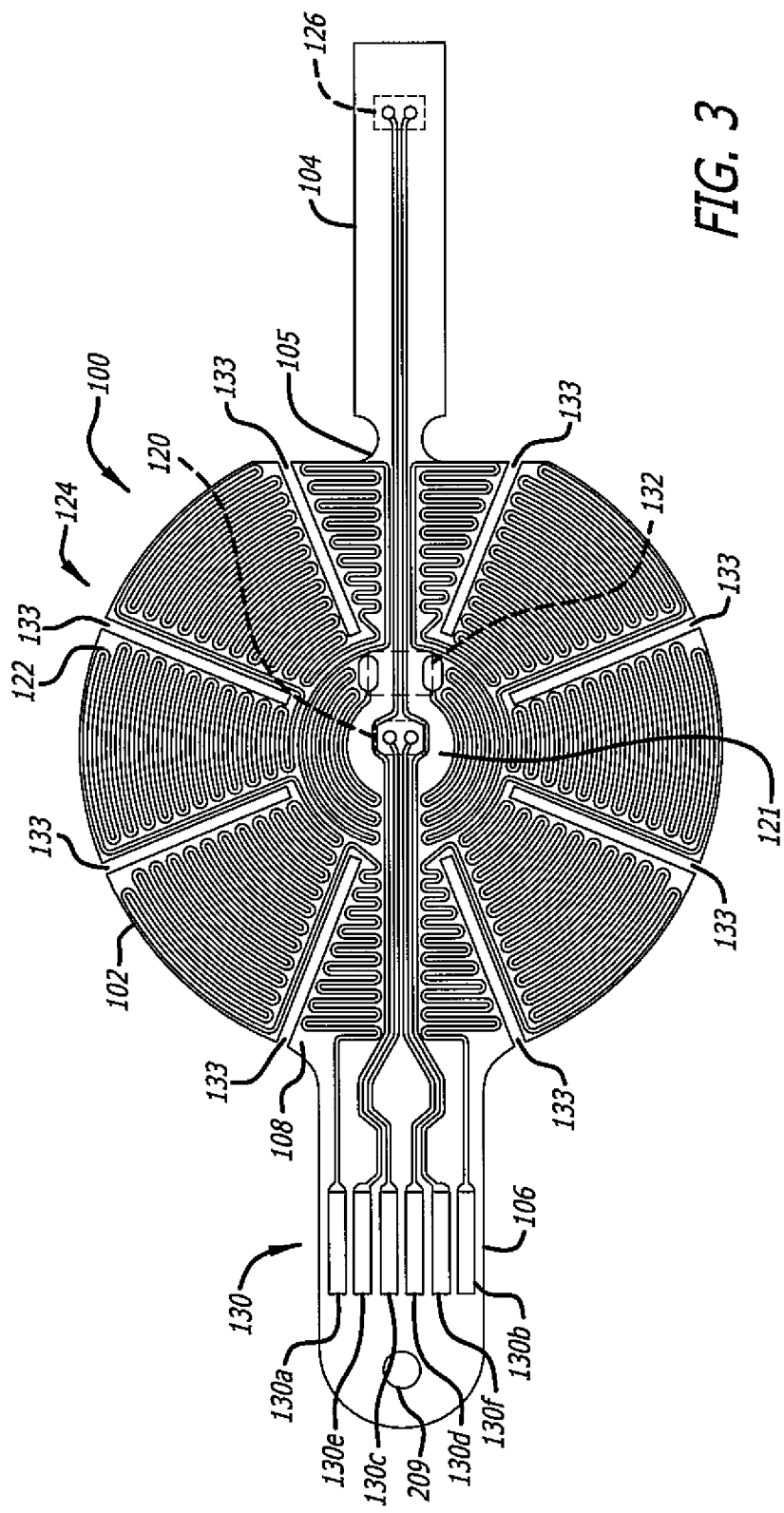
FIG. 3 is a plan view of a side of a flexible substrate showing an electrical circuit disposed on a surface of the substrate for temperature measurement.

A layout for a zero-heat-flux, DTT measurement device is illustrated in FIG. 3. The device includes an electrical circuit disposed on a flexible substrate in order to adapt or conform the physical configuration of the temperature measurement device to differing contours encountered at different temperature measurement locations. Preferably, but not necessarily, the flexible substrate is constructed or fabricated to have a plurality of contiguous sections. For example, the flexible substrate 100 has three contiguous sections 102, 104, and 106. The first, or center, section 102 is substantially circular in shape. The second section (or "tail") 104 has the shape of a narrow, elongate rectangle that extends in a first radial direction from the periphery of the first section 102. Where the center section and the tail join at 105, the periphery of the center section has a straight portion and the width of the tail is reduced. The third, or tab, section 106 has the shape of a broad, elongate rectangle that extends in a second radial direction from the periphery of the center section 102. Preferably, the tail and tab are aligned along a diameter of the center section.

As per FIG. 3, the elements of the electronic circuit are disposed on a single surface, on a first side 108 of the flexible substrate. A first thermal sensor 120 is positioned inside the outer perimeter of the center section 102, preferably near or at the center of the center section 102. An electrically conductive heater trace 122 defines a heater with a shape that surrounds or encircles a zone 121 in which the first thermal sensor 120 is located. In the preferred embodiment illustrated in FIG. 3, the heater trace has an annular shape that includes a circular array of wedge-shaped heater zones 124 that surround or encircle the zone 121 and the first thermal sensor 120 which is disposed in the zone. A second thermal sensor 126 is positioned on the tail 104. A plurality of electrical connection pads 130 is located on the tab 106. The heater trace includes two electrically conductive trace sections that terminate in the connection pads 130a and 130b. Two electrically conductive traces extend between mounting pads on which the first thermal sensor 120 is mounted and the connection pads 130c and 130d. Two additional electrically conductive traces extend between mounting pads on which the second thermal sensor 126 is mounted and the connection pads 130e and 130f.

In the specific layout shown of the preferred embodiment shown in FIG. 3, the path of the heater trace 122 crosses the paths of the two traces for the second thermal sensor 126. In this case, the continuity of the heater trace is preferably, but not necessarily, maintained by an electrically conductive zero-ohm jumper 132 which crosses, and is electrically isolated from, the two traces for the second thermal sensor 126. In other embodiments, the continuity of the heater trace 122 can also be maintained by vias to the second side of the flexible substrate, by running the thermal sensor traces around the periphery of the first side of the flexible substrate, by a jumper wire instead of the zero-ohm resistor, or by any equivalent solution.

The flexibility or conformability of the flexible substrate can be enhanced by a plurality of slits 133 that define zones which move or flex independently of each other. In the preferred embodiment, the slits 133 are made in the center section 102 in a pattern that follows or accommodates the layout of the heater trace 122. The pattern at least partially separates the heater zones 124 so as to allow any one of the heater zones 124 to move independently of any other heater zone. The preferred pattern of slits is a radial pattern in that each slit is made along a respective radius of the circular center section 102, between adjacent heater zones, and extends along the radius from the periphery of the center section 102 toward the center of the circular shape of the section. This is not meant to exclude other possible slit configurations determined by the different shapes of the heater trace layout and the flexible substrate sections.

Sections of the flexible substrate are brought or folded together about an insulator to provide thermal resistance between the first and second thermal sensors 120 and 126 in a configuration that is preferred for ZHF temperature measurement. For example, at least the center and tail sections 102 and 104 of the flexible substrate are brought or folded together about a flexible insulator. Preferably, the first and second thermal sensors 120 and 126 are thereby disposed on respective sides of a thermal insulator. In this regard, with reference to FIGS. 3 and 4, the center section 102 and tail 104 are folded together about a flexible layer of insulating material 140. The layer 140 provides thermal and electrical resistance between the thermal sensors; it also supports the thermal sensors in a spaced-apart configuration.

Figure 4:
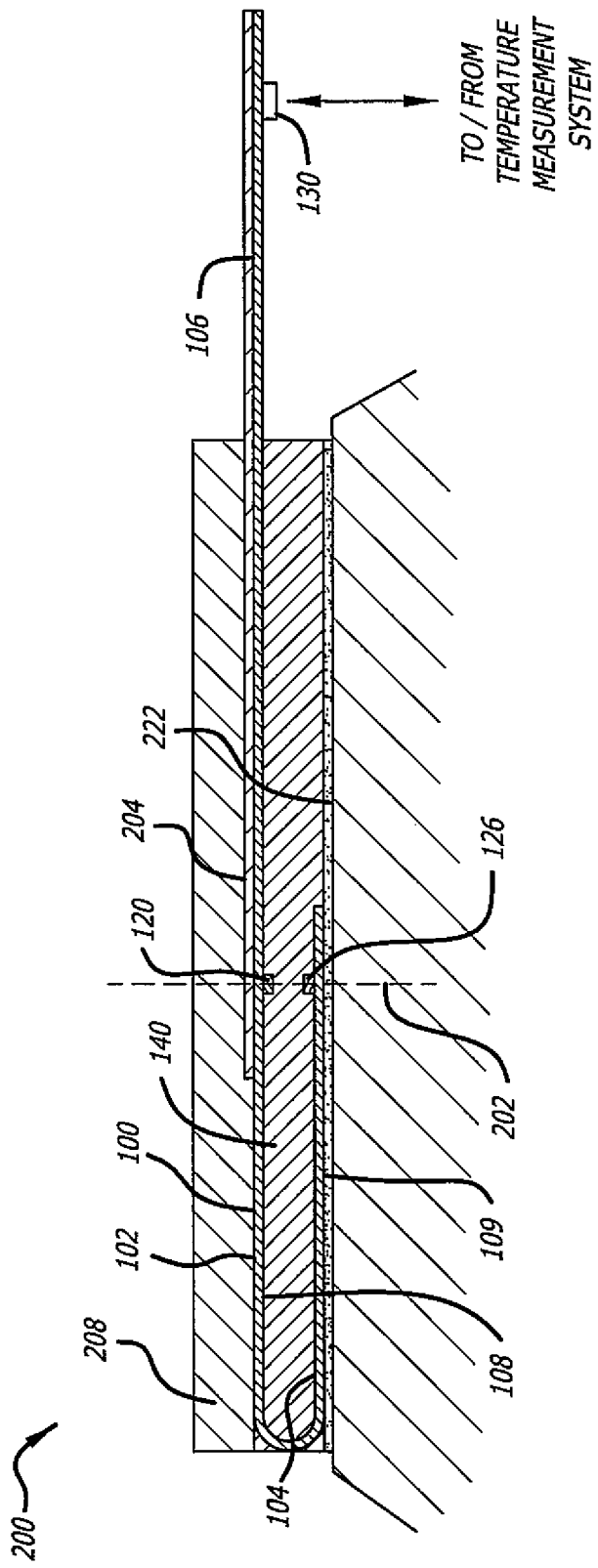
FIG. 4 is a side sectional view of a temperature device that incorporates the electrical circuit of FIG. 3.

A flexible temperature measurement device construction includes an electrical circuit laid out on a side of a flexible substrate as shown in FIG. 3. With two sections of the flexible substrate brought or folded together so as to sandwich a flexible insulator, the construction has a multilayer structure as best seen in FIG. 4. Thus, a temperature measurement device 200 includes the electrical circuit laid out on the surface of the first side 108 of the flexible substrate 100. The central and tail sections 102 and 104 are brought or folded together about the flexible insulating layer 140 so as to provide a thermal resistance between the first and second thermal sensors 120 and 126. The flexible insulating layer also maintains the first and second thermal sensors disposed in a spaced relationship. Preferably, but not necessarily, the second thermal sensor 126 is aligned with the first thermal sensor on a line 202 which passes through the zone 121 that is surrounded by the heater trace (seen in FIG. 3). The temperature measurement device further includes a flexible heater insulator 208 attached to a second side 109 of the substrate 100, over the center section 102.

The layout of the electrical circuit illustrated in FIG. 3 locates all of the circuit components on a single surface on one side of the flexible substrate 100. This layout confers several advantages. First, it requires only a single fabrication sequence to lay down traces for the heater, the thermal sensors, and the connection pads, thereby simplifying manufacture of the device. Second, when the sections carrying the thermal sensors are folded together, the thermal sensors are maintained within a thermally and mechanically controlled environment.

Another benefit of the preferred layout shown in FIG. 3 is that the first thermal sensor 120 is physically separated from the heater, in a zone 121 that is surrounded or encircled by the heater trace 122, and not stacked under it as in the Fox/Solman system. When the temperature measurement device is activated, the heater is turned on and the heat produced thereby travels generally vertically from the heater to the patient, but only medially to the first thermal sensor. As a result, the jump in temperature that occurs when the heater is activated is not immediately sensed by the first thermal sensor, which improves control of the heater and stability of the temperature measurement without requiring an increase in thermal mass of the temperature measurement device. Thus, the first temperature sensor 120 is preferably located in the same plane, or on the same surface, as the heater trace 122 (and can even be elevated slightly above the heater trace), and substantially in or in alignment with the zone 121 of zero heat flux.

It is desirable that the temperature measurement device support a pluggable interface for convenience and for modularity of a patient vital signs monitoring system. In this regard, and with reference to FIGS. 3 and 4, the tab 106 is configured with the array of pads 130 so as to be able to slide into and out of connection with a connector (not shown). In order to provide a physically robust structure capable of maintaining its shape while being connected and disconnected, the tab 106 is optionally stiffened. In this regard, a flexible stiffener 204 is disposed on the second side 109 of the flexible substrate 100. The stiffener extends substantially coextensively with the tab 106 and at least partially over the center section 102. As best seen in FIG. 4, the stiffener 204 is disposed between the second side 109 of the flexible substrate 100 and the flexible insulator 208. A key to align the tab 106 and prevent misconnection with an electrical connector (not shown) and to retain the connector on the tab may be provided on the device 200. For example, with reference to FIG. 5, such a key includes an opening 209 through the stiffener and tab.

The temperature measurement device 200 is mounted on a region of skin where temperature is to be measured with the second thermal sensor 126 closest to the skin. As seen in FIG. 4, a layer of adhesive 222 is disposed on the second side 109, on the layer of insulation 140 and the portion of the tail 104 where the second sensor 126 is located. A release liner (not shown in this figure) may be peeled from the layer of adhesive 222 to prepare the device 200 for attachment to the skin. When deployed as shown in FIG. 4, a pluggable signal interface between the electrical circuit on the device 200 and a temperature measurement system is provided through the plurality of electrical connection pads 130 located in the tab 106. The signals transferred therethrough would include at least heater activation and thermal sensor signals.

Use of an electrical circuit on a flexible substrate greatly simplifies the construction of a disposable temperature device for estimating deep tissue temperature, and substantially reduces the time and cost of manufacturing such a device. In this regard, manufacture of a temperature measurement device incorporating an electrical circuit laid out on a side of the flexible substrate 100 with the circuit elements illustrated in FIG. 3 may be understood with reference to FIGS. 5 and 6A-6F. Although a manufacturing method is described in terms of specifically numbered steps, it is possible to vary the sequence of the steps while achieving the same result. For various reasons, some of the steps may include more operations, or fewer, than described. For the same or additional reasons, some of the described steps may be deleted, and/or other steps that are not described may be added. Further, steps may be combined with other steps, and/or partitioned into additional steps.

Figure 6A:
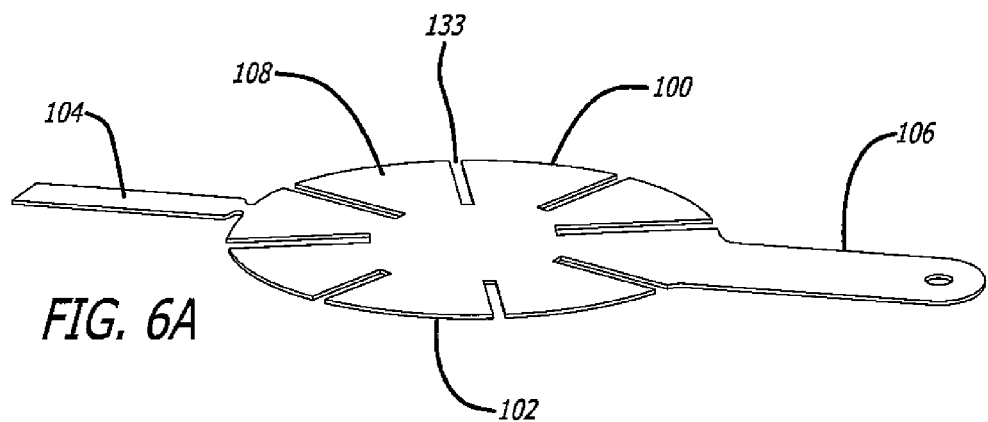
FIGS. 6A-6F illustrate a method of temperature device manufacture based on the temperature device of FIGS. 4 and 5.

In FIG. 6A, the traces and pads for an electrical circuit are fabricated on a first side 108 of a flexible substrate 100 with a center section 102, a tail 104 extending from the center section, and a tab 106 extending from the center section. The electronic elements (first and second thermal sensors) are mounted to the traces to complete an electrical circuit (which is omitted from these figures for convenience) including the elements of FIG. 3, laid out as shown in that figure. If used, the pattern of slits 133 separating the heater zones may be made in the center section in this manufacturing step.

Figure 5:
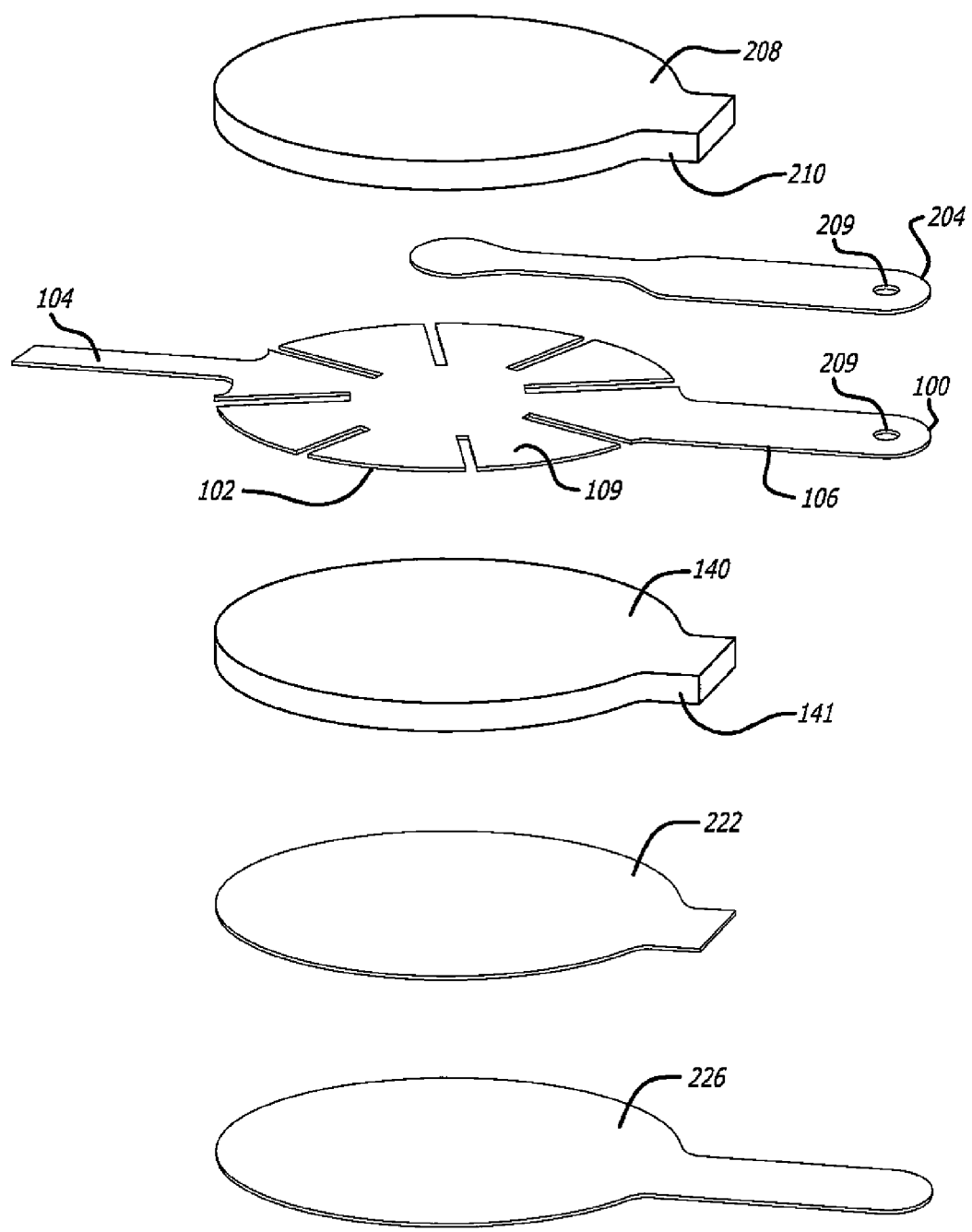
FIG. 5 is an exploded assembly view, in perspective, showing elements of the temperature device of FIG. 4.
Figure 6B:
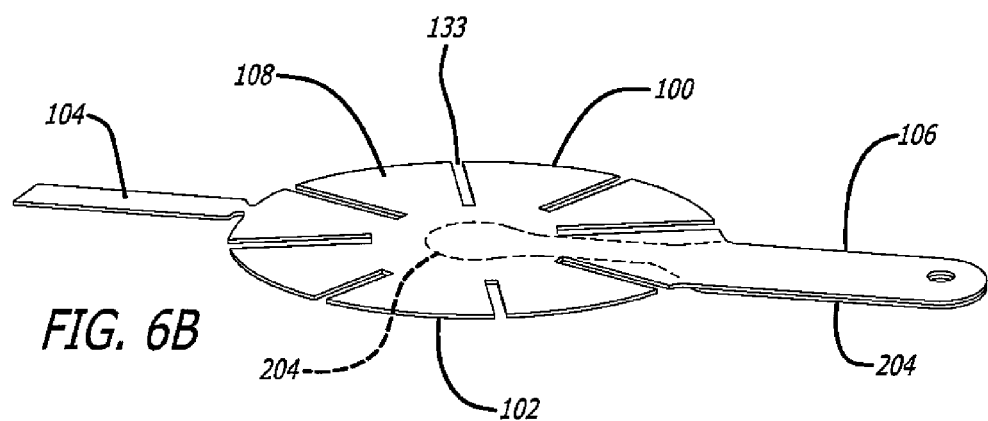

As per FIG. 6B, in a second manufacturing step, a stiffener 204 is laminated to a second side of the flexible substrate. As best seen in FIG. 5, the stiffener has a portion shaped identically to the tab and narrows to an elongated portion with a circular tip. When laminated to the second side 109, the stiffener substantially extends over the tab and partially over the center section, beneath the zone 121. Preferably, an adhesive film (not seen), or equivalent, attaches the stiffener to the second side of the flexible substrate.

Figure 6C:
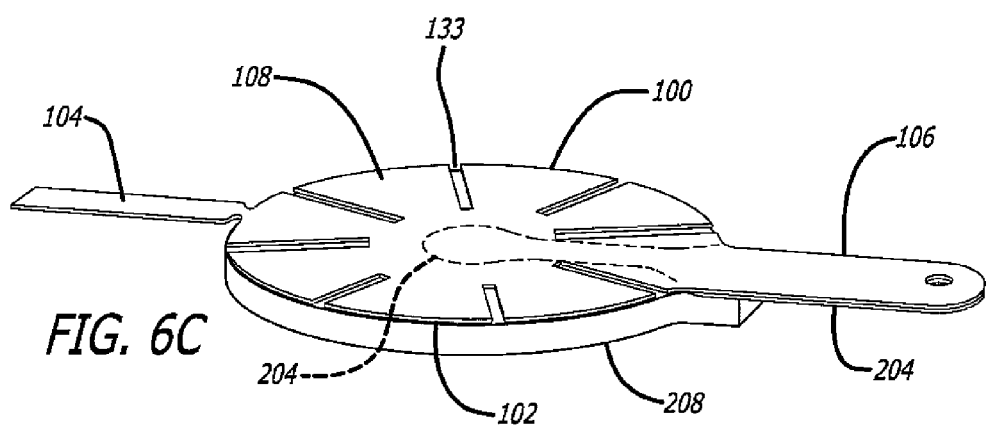

As per FIG. 6C, in a third manufacturing step, a flexible layer 208 of insulating material is attached by adhesive or equivalent to the first side of the flexible substrate, over substantially all of the center section and at least a portion of the stiffener. This layer is provided to insulate the heater from the ambient environment. As best seen in FIG. 5, this flexible layer may include a truncated tab 210 that provides additional reinforcement to a pluggable connection between the tab 106 and a system connector.

Figure 6D:
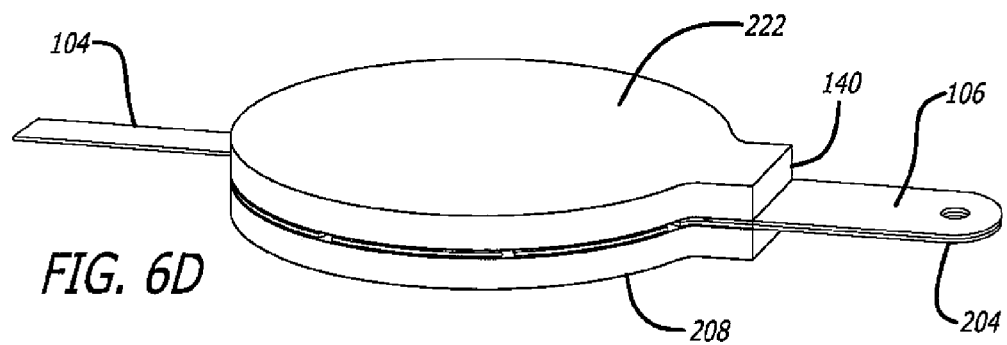

As per FIG. 6D, in a fourth manufacturing step, a flexible central layer of insulating material 140 is attached to the first side 108, over the center section, to cover the heater trace and the first thermal sensor. As best seen in FIG. 5, this flexible layer may also include a truncated tab 141 that provides additional reinforcement to a pluggable connection between the tab and a system connector.

Figure 6E:
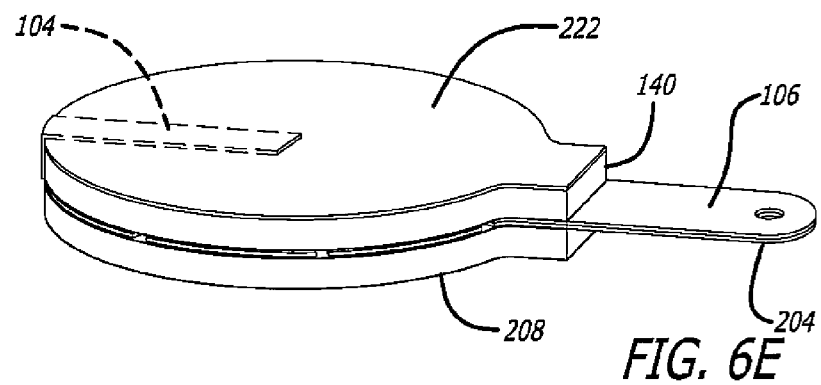

As per FIG. 6E, in a fifth manufacturing step, the tail 104 is folded over the central layer of insulating material 140 such that the first and second thermal sensors are maintained by the central layer in the preferred spaced relationship.

Figure 6F:
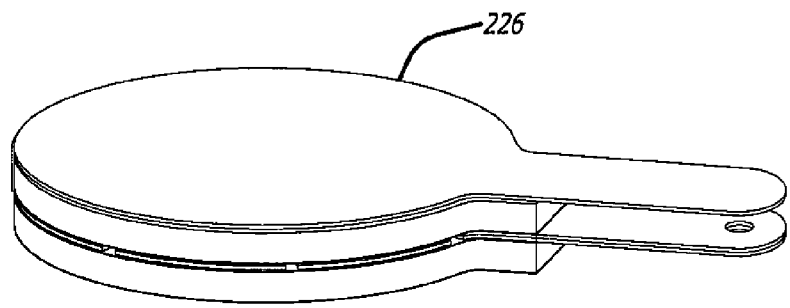

As per FIG. 6F, in a sixth manufacturing step, a layer of adhesive (not seen) with a release liner 226 is attached to the central insulating layer, over the central insulating layer with the tail folded thereto. As best seen in FIG. 5, the release liner 226 may have a shape that corresponds to the central section 102 and tab 106.

In a best mode of practice, a temperature measurement device according to this specification has been fabricated using the materials and parts listed in the following table. An electrical circuit with copper traces and pads conforming to FIG. 3 was formed on a flexible substrate of polyimide film by a conventional photo-etching technique and thermal sensors were mounted using a conventional surface mount technique. The dimensions in the table are thicknesses, except that Ø signifies diameter. Of course, these materials and dimensions are only illustrative and in no way limit the scope of this specification. For example, traces may be made wholly or partly with electrically conductive ink.

Table of Materials and Parts: I

| Element | Material | Representative dimensions |
| --- | --- | --- |
| Flexible substrate | Kapton ® polyimide film with deposited and photo-etched copper traces and pads | Substrate 100: 0.05 mm |
| Thermal sensors | NTC thermistors, Part # R603-103F-3435-C, Redfish Sensors | |
| Flexible insulating layers | Closed cell polyethylene foam with skinned major surfaces coated with pressure sensitive adhesive (PSA) | Insulator 208: Ø50 × 1.5 mm Insulator 140: Ø50 × 3.0 mm |
| Stiffener | Polyethylene terephthalate (PET) | Stiffener 204: 0.25 mm |

Zero-Heat-Flux DTT Measurement Device Constructions

Zero-heat-flux DTT measurement devices according to FIG. 3 and the preceding description have been fabricated, assembled, and clinically tested. We have found that it is desirable to further adapt the construction of such devices so as to increase the number of sites where they can be deployed, without necessarily enlarging the devices or sacrificing the accuracy with which they perform DTT measurement.

These objectives are met by a heater construction with a central power density portion and a peripheral power density, portion surrounding the central power density portion. The central power density portion operates with a first power density and the peripheral power density portion operates with a second power density of a higher magnitude than the first power density so as to maintain a substantially uniform temperature from the central heater portion to the periphery of the heater when the device is placed on skin to measure core body temperature.

Figure 7:
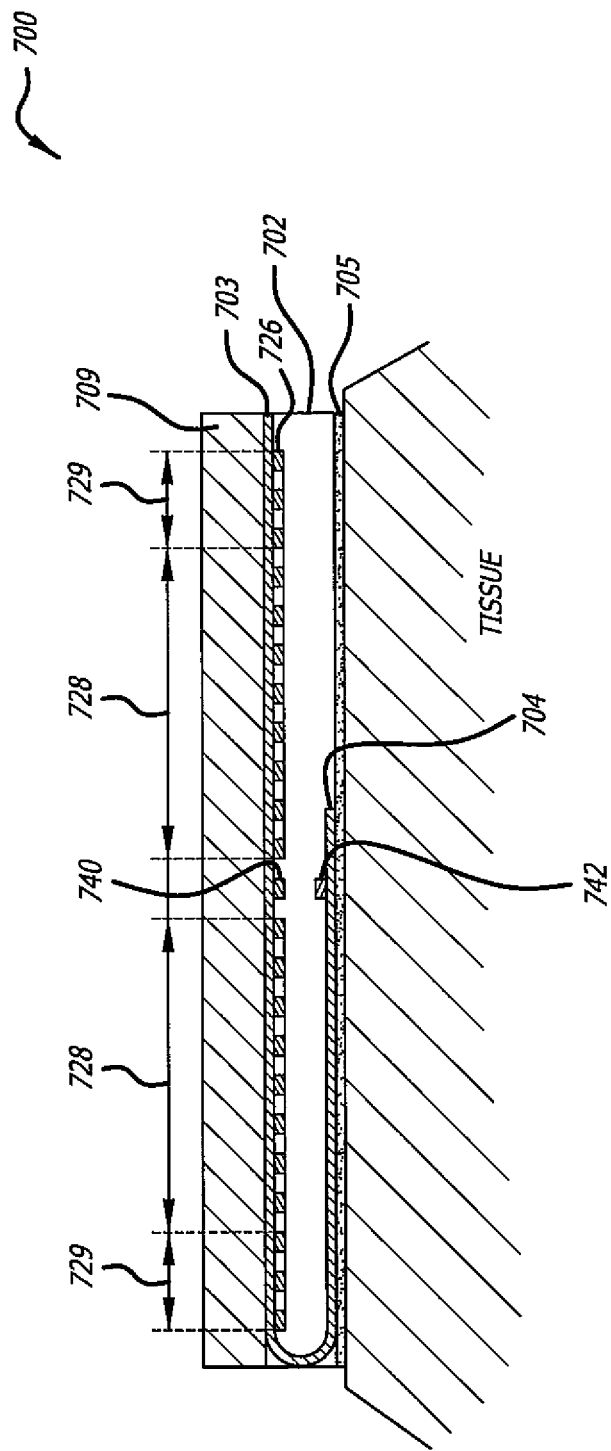
FIG. 7 is a side sectional, partly schematic illustration of a zero-heat-flux DTT measurement device with a heater having central and peripheral portions.

FIG. 7 is a sectional, partially-schematic illustration of a preferred zero-heat-flux DTT measurement device construction. Not all elements of the measurement device are shown in the figure; however, the figure does show relationships between components of the construction that are relevant to zero-heat-flux measurement. The measurement device 700 includes flexible substrate layers, a layer of thermally insulating material, and an electrical circuit. The electrical circuit includes a heater 726, a first thermal sensor 740, and a second thermal sensor 742. The heater 726 and the first thermal sensor 740 are disposed in or on a flexible substrate layer 703 and the second thermal sensor 742 is disposed in or on a flexible substrate layer 704. The first and second substrate layers 703 and 704 are separated by a flexible layer 702 of thermally insulating material. The flexible substrate layers 703 and 704 can be separate elements, but it is preferred that they be sections of a single flexible substrate folded around the layer of insulating material. Preferably, adhesive film (not shown) attaches the substrate to the insulating layer 702. A layer of adhesive material 705 mounted to one side of the substrate layer 704 is provided with a removable liner (not shown) to attach the measurement device to skin. Preferably, a flexible layer 709 of insulating material lies over the layers 702, 703, and 704 and is attached by adhesive film (not shown) to one side of the substrate layer 702. The insulating layer 709 extends over the heater 726 and the first thermal sensor 740.

In use, the measurement device 700 is disposed with the second thermal sensor 742 nearest the skin. The layer 702 is sandwiched between the first and second substrate layers 703 and 704 so as to separate the heater 726 and first thermal sensor 740 from the second thermal sensor 742. In operation, the layer 702 acts as a large thermal resistance between the first and second thermal sensors, the second thermal sensor 742 senses the temperature of the skin, and the first thermal sensor senses the temperature of the layer 702. While the temperature sensed by the first thermal sensor 740 is less than the temperature sensed by the second thermal sensor 742, the heater is operated to reduce heat flow through the layer 702 and the skin. When the temperature of the layer 702 equals that of the skin, heat flow through the layer 702 stops and the heater is switched off. This is the zero-heat-flux condition as it is sensed by the first and second sensors 740 and 742. When the zero-heat-flux condition occurs, the temperature of the skin, indicated by the second thermal sensor, is interpreted as core body temperature. In the zero-heat-flux DTT measurement device constructions that are to be described in detail, the heater 726 has a central heater portion 728 that operates with a first power density, and a peripheral heater portion 729 surrounding the central heater portion that operates with a second power density higher than the first power density. Of course, the flexibility of the substrate permits the measurement device 700, including the heater 726, to conform to body contours where measurement is made.

Figure 8A:
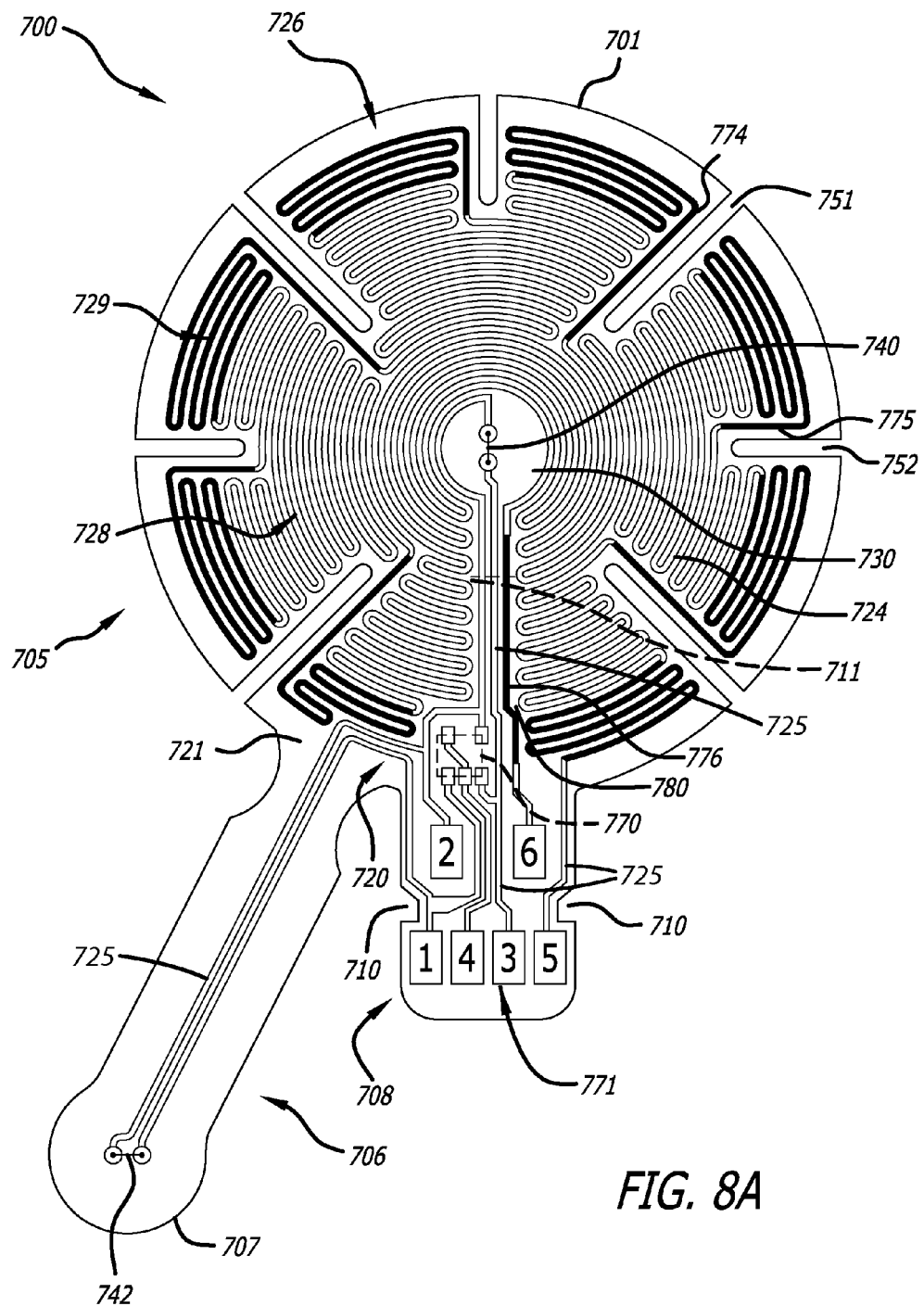
FIG. 8A illustrates a first construction of the zero-heat-flux DTT measurement device construction of FIG. 7.

With reference to FIG. 8A, a first construction of a zero-heat-flux DTT measurement device 700 includes a flexible substrate 701. Preferably, but not necessarily, the flexible substrate 701 has contiguous sections 705, 706, and 708. Preferably, but not necessarily, the first, or center, section 705 is substantially circular in shape. The second section (or "tail") 706 has the shape of a narrow, elongated rectangle with a bulbous end 707 that extends outwardly from the periphery of the center section 705 in a first direction. The third section (or "tab") 708 has the shape of a wide rectangle that extends outwardly from the periphery of the center section 705 in a second direction. Opposing notches 710 are formed in the tab 708 to receive and retain respective spring-loaded retainers of a cable connector (not shown). Preferably but not necessarily, the tail 706 is displaced from the tab 708 by an arcuate distance of less than or equal to 180° in either a clockwise or a counterclockwise direction.

As per FIG. 8A, an electrical circuit 720 is disposed on the flexible substrate 701. Preferably, but not necessarily, the elements of the electrical circuit 720 are located on the surface 721 of the flexible substrate 701. The electrical circuit 720 includes at least an electrically conductive heater trace, thermal sensors, electrically conductive connective trace portions, and electrical connection pads. It is desirable that some, but not necessarily all, embodiments of the electrical circuit 720 also include at least one multi-pin electronic circuit device, such as an electronically programmable memory 770. The heater trace 724 defines a generally annular heater 726 surrounding a zone 730 of the substrate 701 into which no portion of the heater trace 724 extends; in this regard, the zone 730 is not directly heated when the heater operates. The zone 730 occupies a generally circular portion of the surface 721. More completely, the zone 730 is a cylindrical section of the substrate 701 which includes the portion of the surface 721 seen in FIG. 8A, the counterpart portion of the opposing surface (not seen in this figure), and the solid portion therebetween. Preferably, but not necessarily, the zone 730 is centered in the center section 705 and is concentric with the heater 726. A first thermal sensor 740 is mounted on mounting pads formed in the zone 730. A second thermal sensor 742 is mounted on mounting pads disposed outside of the generally annular heater 726; preferably, these mounting pads are formed generally near the end of the tail, for example, in or near the center of the bulbous end 707 of the tail. In some constructions the electrical circuit 720 includes at least one multi-pin electronic circuit device mounted on the measurement device 700. For example an electrically-erasable programmable read/write memory 770, is mounted on mounting pads formed on a portion of the surface 721 on the center section 705 near or adjacent the tab 708. Electrical connection pads ("electrical pads") are formed on the surface 721, in the tab 708. A plurality of conductive trace portions 725 connects the first and second thermal sensors and the heater trace with a plurality of the electrical pads 771. If the measurement device 700 includes a multi-pin electronic circuit device, one or more additional electrical pads and additional conductive trace portions are provided for the device; preferably, but not necessarily, at least one such additional pad is shared by the device and one of the heater, the first thermal sensor, and the second thermal sensor.

As seen in FIG. 8A, preferably, but not necessarily, the center section 705 has formed therein a plurality of slits 751, 752 to enhance the flexibility and conformability of the flexible substrate. The slits extend radially from the periphery toward the center of the center section 705. The slits define zones which move or flex independently of each other. The layout of the heater trace 724 is adapted to accommodate the slits. In this regard, the heater trace follows a zigzag or switchback pattern with legs that increase in length from the periphery of the zone 730 to the ends of the longer slits 751 and then, after a step decrease at those ends, generally increase in length again to the outer periphery of the heater 726 in the zones defined by the slits. As illustrated, the construction of the heater has a generally annular shape centered in the zone 730, although the annularity is interrupted by the slits. Alternatively, the annular shape can be viewed as including a peripheral annulus of wedge-shaped heater zones surrounding a generally continuous central annulus.

A non-uniform power density heater structure can be understood with reference to FIG. 8A, where the heater 726 includes a central portion 728 (indicated by lightly drawn lines) having a first power density and a peripheral portion 729 (indicated by heavily drawn lines) which surrounds the central portion 728 and has a second power density higher than the first power density. The heater trace 724 is continuous and includes two ends, a first of which transitions to electrical pad 5, and the second to electrical pad 6. However, because of the slits, each of the central and peripheral portions 728 and 729 includes a plurality of sections arranged in a sequence, in which the sections of the central portion 728 alternate with the sections of the peripheral portion. Nevertheless, the annular structure of the heater arrays the sections of the central portion 728 generally in a central annulus around the zone 730, and arrays the sections of the peripheral portion 729 around the central portion 728. When the heater 726 is operated, the central portion 728 produces a central annulus of heat at the first power density surrounding the zone 730 and the peripheral portion 729 produces a ring-shaped annulus of heat at the second power density that surrounds the central annulus of heat.

Preferably the heater trace 724 is continuous, but exhibits a nonuniform power density along its length such that the central heater portion 728 has a first power density and the peripheral portion 729 has a second power density that is greater than the first power density. With this configuration, a driving voltage applied to the heater 726 will cause the central heater portion 728 to produce less power per unit of heater area of the heater trace than the outer heater portion 729. The result will be a central annulus of heat at a first average power surrounded by a ring of heat a second average power higher than the first.

The differing power densities of the heater portions 728 and 729 may be invariant within each portion, or they may vary. Variation of power density may be step-wise or continuous. Power density is most simply and economically established by the width of the heater trace 724 and/or the pitch (distance) between the legs of a switchback pattern. For example, the resistance, and therefore the power generated by the heater trace, varies inversely with the width of the trace. For any resistance, the power generated by the heater trace also varies inversely with the pitch of (distance between) the switchback legs.

Figure 8B:
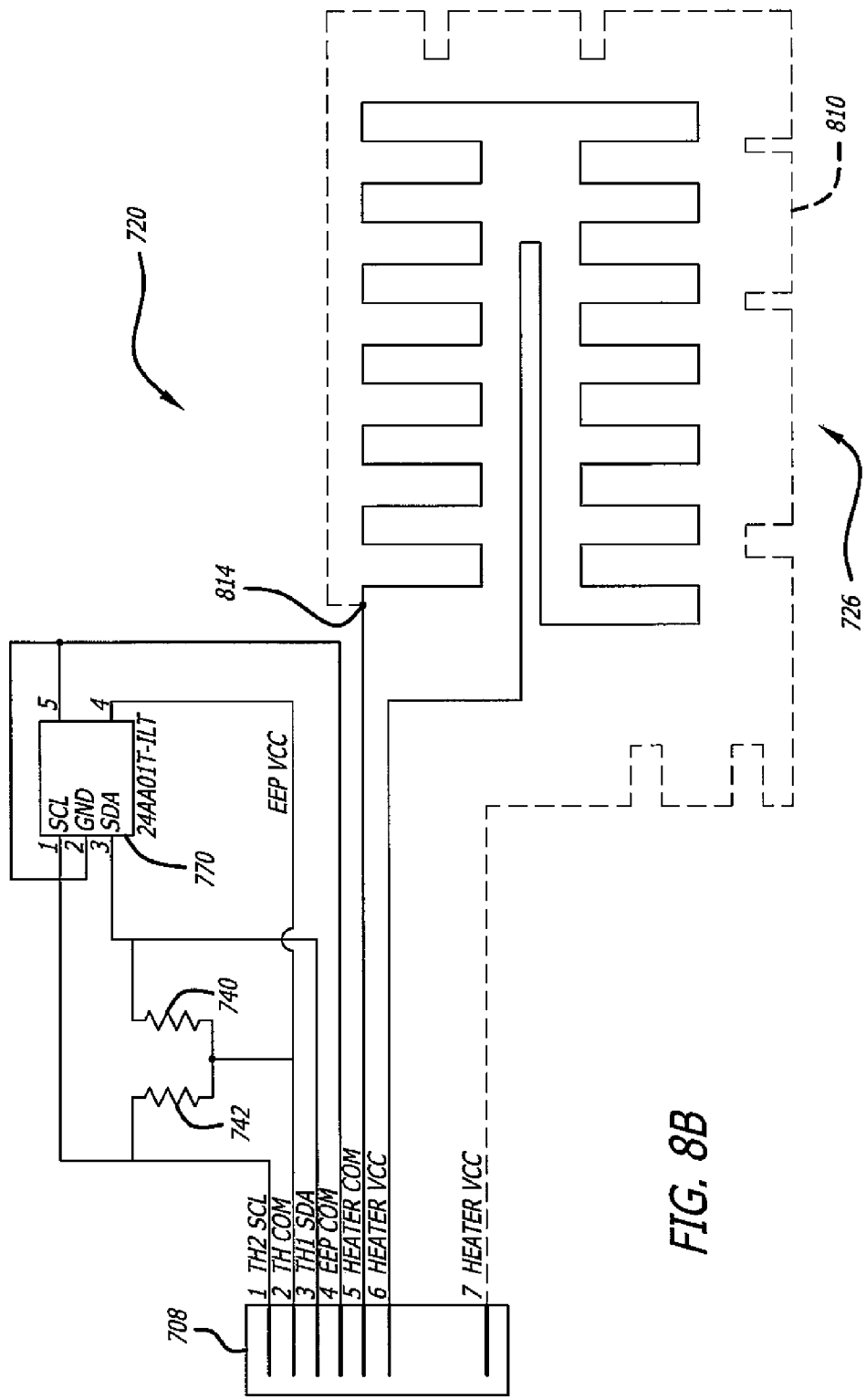
FIG. 8B is a schematic diagram including elements of the measurement device.

The electrical circuit 720 on the flexible substrate 701 seen in FIG. 8A is shown in schematic form in FIG. 8B. The electrical pads on the tab 708 numbered 1-6 in FIG. 8A correspond to the identically-numbered elements in FIG. 8B. The number of electrical pads shown is merely for illustration. More, or fewer, electrical pads can be used; any specific number is determined by design choices including the presence or absence of a multi-pin electronic device, the heater construction, the number of thermal sensors, and so on. In some constructions it is desirable to utilize one or more of the electrical pads for electrical signal conduction to or from more than a single element of the electrical circuit 720 in order to minimize the number of electrical pads, thereby simplifying the circuit layout, minimizing the size and mass of the tab 708, and reducing interface connector size.

Presume that the electrical circuit 720 includes a multi-pin electronically programmable memory (EEPROM) 770 such as a 24AA01T-I/OT manufactured by Microchip Technology and mounted by mounting pads to the zero-heat-flux DTT measurement device 700. FIGS. 8A and 8B illustrate a construction in which one or more electrical pads are shared by at least two elements of the electrical circuit. In this regard:

one lead of the second thermal sensor 742 and pin 1 of the memory 770 are connected by conductive trace portions to electrical pad 1;

leads of the first and second thermal sensors 740 and 742 and pin 4 of the memory 770 are connected by conductive trace portions to electrical pad 2;

one lead of the first thermal sensor 740 and pin 3 of the memory 770 are connected by conductive trace portions to electrical pad 3;

pins 2 and 5 of the memory 770 are connected by a conductive trace portion to electrical pad 4;

the return end of the heater trace 724 is connected by a conductive trace portion to electrical pad 5; and the input end of the heater trace 724 is connected by a conductive trace portion to electrical pad 6.

With reference to FIGS. 7 and 8A, when the measurement device 700 is assembled, the center section 705 and tail 706 are folded together about a flexible layer of insulating material such as the layer 702. The layer 702 provides thermal resistance and electrical insulation between the thermal sensors; it also supports the thermal sensors in a spaced-apart configuration. In other words, the first and second thermal sensors 740 and 742 are disposed on respective layers of substrate material that are separated by the layer of insulating material with the heater and first thermal sensor facing one side of the layer of insulating material and the second thermal sensor facing the other.

Refer again to FIG. 8A for an understanding of elements of the measurement device 700 that maintain or improve the uniformity of temperature produced by operation of the heater 726. While these elements do produce desirable effects in temperature uniformity, incorporation of any one or more of these elements into the construction of a zero-heat-flux DTT measurement device is optional. Nonpowered areas within the footprint of the heater 726 can compromise temperature uniformity enough to destabilize the zero-heat-flux condition important to making accurate measurements. Accordingly, it is desirable to reduce, if not eliminate, the destabilizing effects of nonpowered areas within the footprint of the heater. In this regard, an elongate heater trace portion with a high power density is formed along a flank of each slit, parallel to the slit; see for example the long heater trace portion 774 that runs along the flank of and parallel to the long slit 751 and the short heater trace portion 775 along the flank of and parallel to the short slit 752. During operation of the heater 726, the high power density of these heater trace portions elevates the power in the areas that flank the slits to help maintain the temperature uniformity of the device. In addition, an elongate heater trace portion 776 with a high power density of the heater trace 724 runs from electrical pad 6 along the aisle 780 where the conductive traces for the first thermal sensor 740 extend. During operation of the heater 726, this heater trace portion elevates the power in the aisle 780.

With respect to FIG. 8A, irregular or incomplete insulation of the nonpowered zone 730 can reduce the accuracy with which the zero-heat-flux condition is sensed. In this regard, the center section 705 and tail 706 are folded together over a layer of thermal insulation in the manner of FIG. 6D when the measurement device 700 is assembled for use. Preferably, the end of the tail 706 overlays the zone 730. If the end of the tail presents an irregular or incomplete insulation of the zone 730, it is possible that a cold spot can form and compromise the operation of the first thermal sensor 740, which is positioned in the zone. Accordingly, the end 707 of the tail 706 has an enlarged bulbous shape that aligns with and overlaps the zone 730, thereby maintaining a regular, continuous level of thermal insulation that overlies the zone.

The zero-heat-flux DTT measurement device 700, with the electrical circuit 720 laid out on one or more sides of the flexible substrate 701 as illustrated in FIG. 8A, can be manufactured and assembled in the manner illustrated in FIGS. 5 and 6A-6F, using materials identified in the Table of Materials and Parts II. Preferably, the measurement device is constructed with a flexible stiffener comprising a separate piece or a layer of material painted, deposited, or formed on the tab 708 and then hardened. Preferably, with reference to FIGS. 4 and 8A, a stiffener for the tab 708 (FIG. 8A) is disposed on the side of the flexible substrate 701 that corresponds to the second side 109 of the flexible substrate 100 (FIG. 4). The stiffener extends substantially coextensively with the tab 708, and at least partially over the center section 705, but stops short of the zone 730, approximately where indicated by the dashed line 711 in FIG. 8A.

Figure 9:
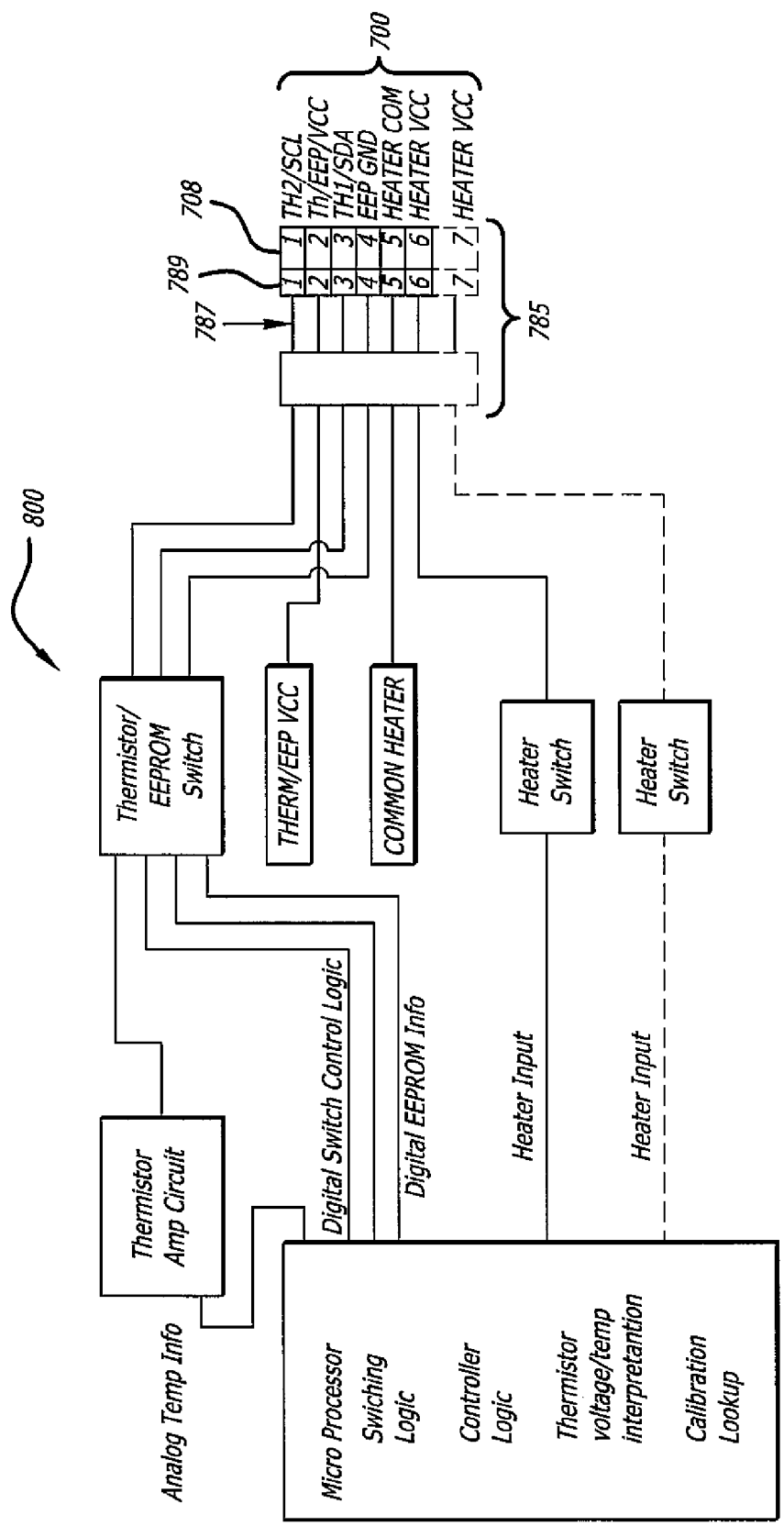
FIG. 9 is a block diagram illustrating a temperature measurement system including a zero-heat-flux DTT measurement device.

The physical layout of FIG. 8A and the corresponding electrical circuit of FIG. 8B illustrate an interface by which operation of a zero-heat-flux DTT measurement device can be controlled and monitored in a DTT measurement system. FIG. 9 illustrates a signal interface between a zero-heat-flux DTT measurement device according to FIG. 7, using the first construction of FIG. 8A as an example. With reference to these figures, a DTT measurement system includes control mechanization 800, a measurement device 700, and an interface 785 that transfers power, common, and data signals between the control mechanization and the measurement device. The interface can be wireless, with transceivers located to send and receive signals. Preferably, the interface includes a cable 787 with a connector 789 releasably connected to the tab 708. The control mechanization 800 manages the provision of power and common signals on respective signal paths to the heater and provides for the separation of the signals that share a common signal path, such as the Thermistor2 (TH2) and SCL signals. A common reference voltage signal is provided on a single signal path to the thermal sensors, and respective separate return signal paths provide sensor data from the thermal sensors.

Presuming inclusion of an EEPROM on the measurement device 700, a separate signal path is provided for EEPROM ground, and the thermal sensor signal paths are shared with various pins of the EEPROM as per FIGS. 8A and 8B. This signal path configuration separates the digital ground for the EEPROM from the DC ground (common) for the heater, for good reason. Presume that the EEPROM and the heater share an electrical pad for ground. The cable 787 including its connector contacts has a certain amount of resistance. If the heater 726 is powered up, the current through it has to return to the control mechanization 800 through the ground (common) contact, which means there will be some voltage developed on the measurement device side of the contact equal to the resistance of that line multiplied by the current through the heater 726. That voltage could be as high as 2 or 3 volts depending on the integrity of the contacts. If concurrently the supply voltage goes low on the EEPROM or even one of the logic lines goes low below this aforementioned generated voltage, the EEPROM would be reversed biased which could damage the part. Separating the heater and EEPROM grounds eliminates all these possibilities for damage to the EEPROM. Accordingly, it is desirable to electrically isolate the heater altogether from the other elements of the electrical circuit. Thus, as per FIG. 9, a first electrical pad (electrical pad 5, for example) of the plurality of electrical pads is connected only to a first terminal end of the heater trace, while a second electrical pad (electrical pad 6, for example) of the plurality of electrical pads is connected only to the second terminal end of the heater trace.

With reference to FIG. 8B, presume that the thermal sensors are NTC (negative temperature coefficient) thermistors. In this case, the common signal on electrical pad 2 is held at a constant voltage level to provide Vcc for the EEPROM and a reference voltage for the thermistors. Control is switched via the thermistor/EEPROM switch circuit between reading the thermistors and clocking/reading/writing the EEPROM. The Table of Signals and Electrical Characteristics summarizes an exemplary construction of the interface 785.

| Table of Signals and Electrical Characteristics | |
|---|---|
| Element | Signals and Electrical Characteristics |
| Thermal sensors 740, 742 | Common reference signal is 3.3 volts DC. Outputs are analog. |
| Heater 726 | Total resistance 6.5 to 7.0 ohms driven by a pulse width modulated waveform of 3.3 volts DC. The power density of the peripheral portion 729 is 30%-60% higher than that of the center portion 728. |
| EEPROM 770 (Micron Technology 24AA01T-I/OT) | Ground is 0 volts. Vcc is 3.3 volts DC. SCL and SDA pins see a low impedance source switched in parallel with the thermistor outputs. |

In a best mode of practice, a temperature measurement device according to FIG. 8A has been fabricated using the materials and parts listed in the following table. An electrical circuit with copper traces and pads was formed on a flexible substrate of polyimide film by a conventional photo-etching technique and thermal sensors were mounted using a conventional surface mount technique. The dimensions in the table are thicknesses, except that signifies diameter. Of course, these materials and dimensions are only illustrative and in no way limit the scope of this specification. For example, the traces may be made wholly or partly with electrically conductive ink. In another example, the thermal sensors are preferably thermistors, but PN junctions, thermocouples, or resistance temperature detectors can also be used.

| Table of Materials and Parts: II | | |
|---|---|---|
| Element | Material/Part | Representative dimensions/ characteristics |
| Flexible substrate 701, heater 726, contacts, and pads | 2 mil thick Polyethylene terephthalate (PET) film with deposited and photo-etched ½ oz. copper traces and pads and immersion silver-plated contacts. | Substrate 701: 0.05 mm thick |
| Thermal sensors 740, 742 | Negative Temperature Coefficient (NTC) thermistors, Part # R603-103F-3435-C, Redfish Sensors. | 10k thermistors in 0603 package. |
| Flexible insulating layers 702, 709 | Closed cell polyethylene foam with skinned major surfaces coated with pressure sensitive adhesive (PSA) | Insulator 702: Ø40 × 3.0 mm thick Insulator 709: Ø40 × 3.0 mm thick |
| Stiffener | 10 mil thick PET film | Stiffener: 0.25 mm thick |
| EEPROM 770 | Micron Technology 24AA01T-I/OT | |

Figure 10:
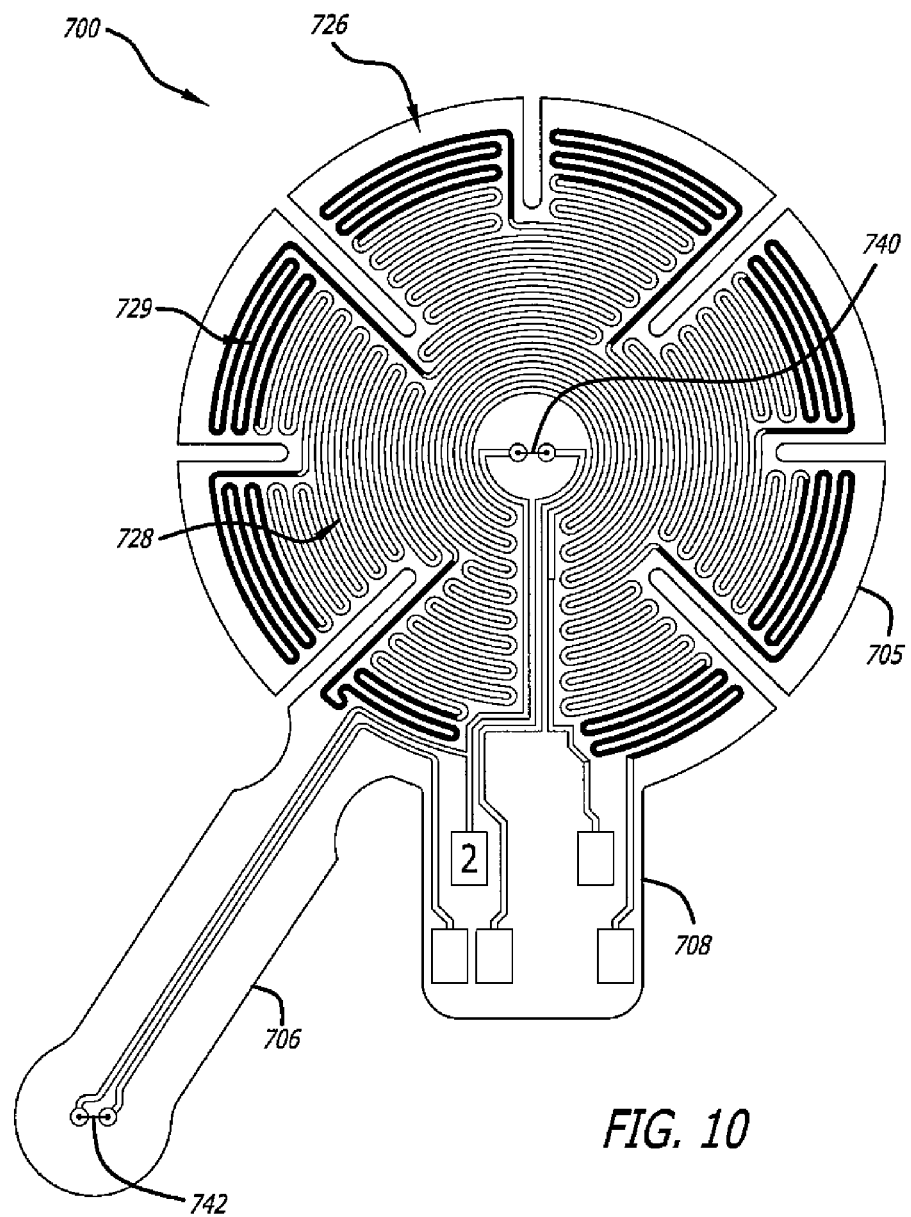
FIG. 10 illustrates a second construction of the zero-heat-flux DTT measurement device construction of FIG. 7.

In a second construction of the measurement device 700, illustrated in FIG. 10, the heater 726 includes central and peripheral heater portions 728 and 729 with different power densities, but the electrical circuit does not include a multi-pin electronic circuit device. In this construction five electrical pads are provided on the tab 708. Absence of the electronic circuit device permits deletion of at least one electrical pad from the tab, which further reduces the size and mass of the tab, and the cost of manufacturing the measurement device. Only electrical pad 2 is shared: it provides a common reference signal for the first and second thermal sensors.

Figure 11:
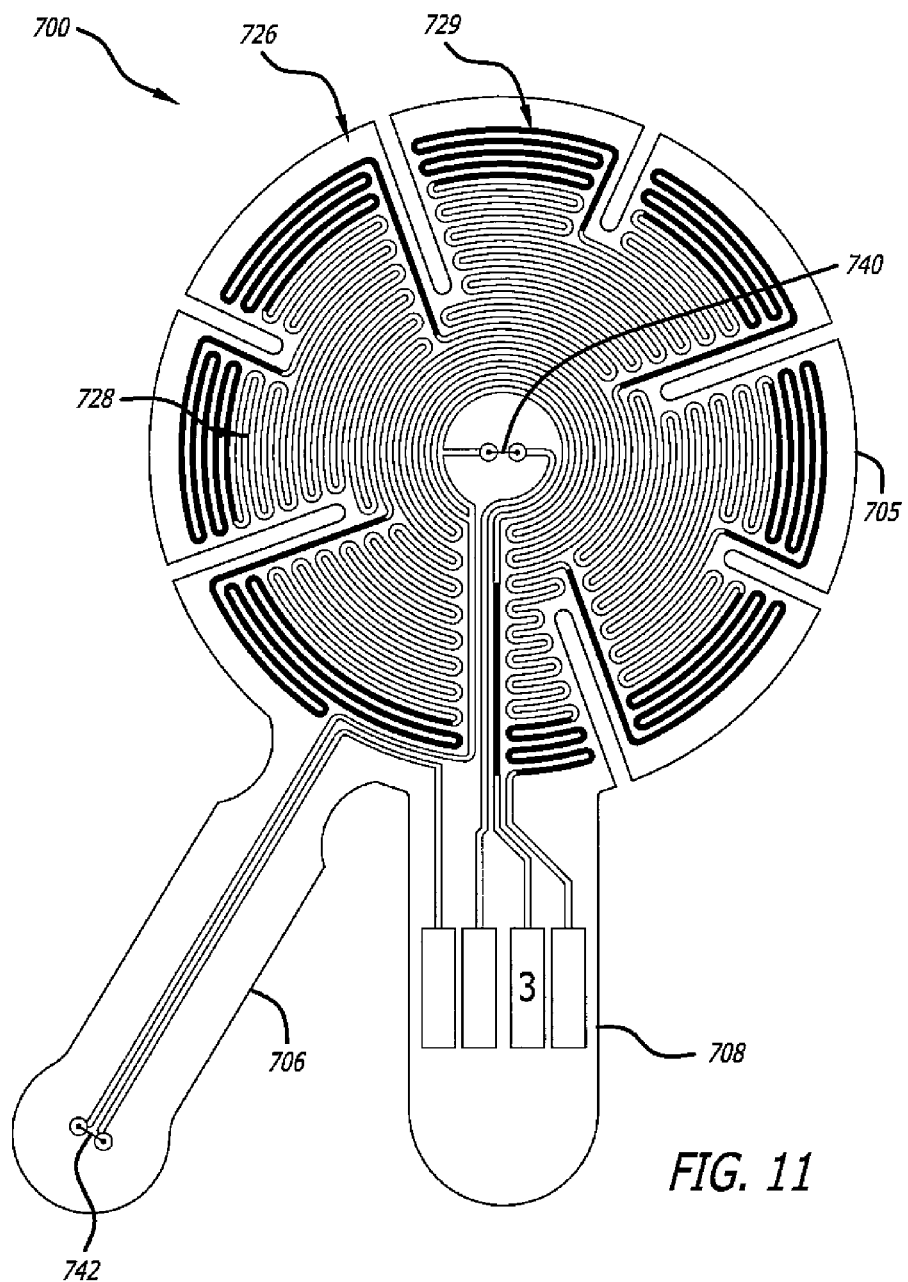
FIG. 11 illustrates a third construction of the zero-heat-flux DTT measurement device construction of FIG. 7.

In a third construction of the measurement device 700, illustrated in FIG. 11, the heater 726 includes central and peripheral heater portions 728 and 729 with different power densities, and the electrical circuit does not include a multi-pin electronic circuit device. In this construction four electrical pads are provided on the tab. Absence of the electronic circuit device permits deletion of at least one electrical pad from the tab. Further, electrical pad 3 is shared so as to provide a common reference signal for the first and second thermal sensors 740 and 742, and for the heater 726, permitting deletion of another electrical pad and further reduction in the size and mass of the tab 708, and the cost of manufacturing the measurement device.

Figure 12:
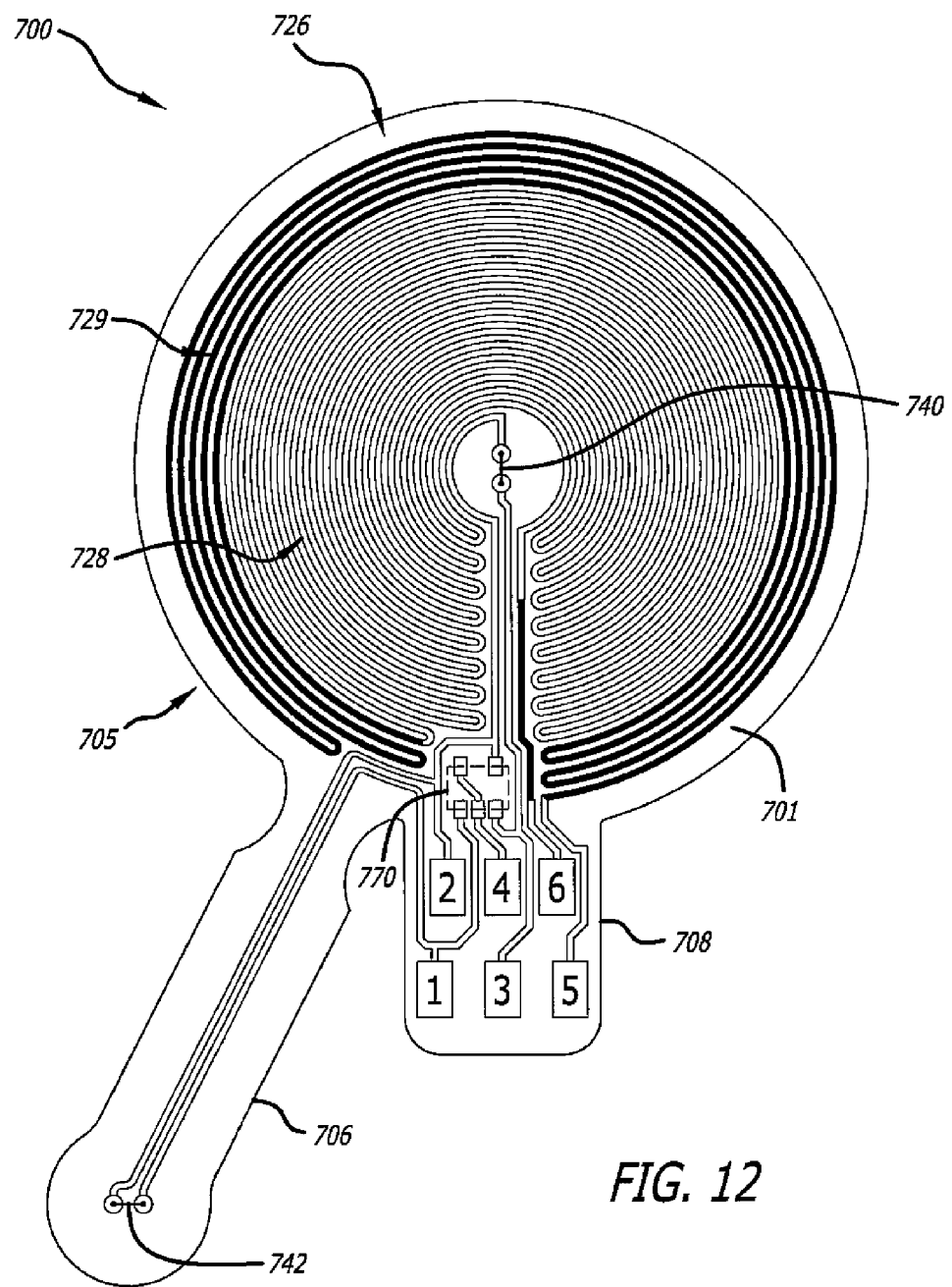
FIG. 12 illustrates a fourth construction of the zero-heat-flux DTT measurement device construction of FIG. 7.
Figure 13:
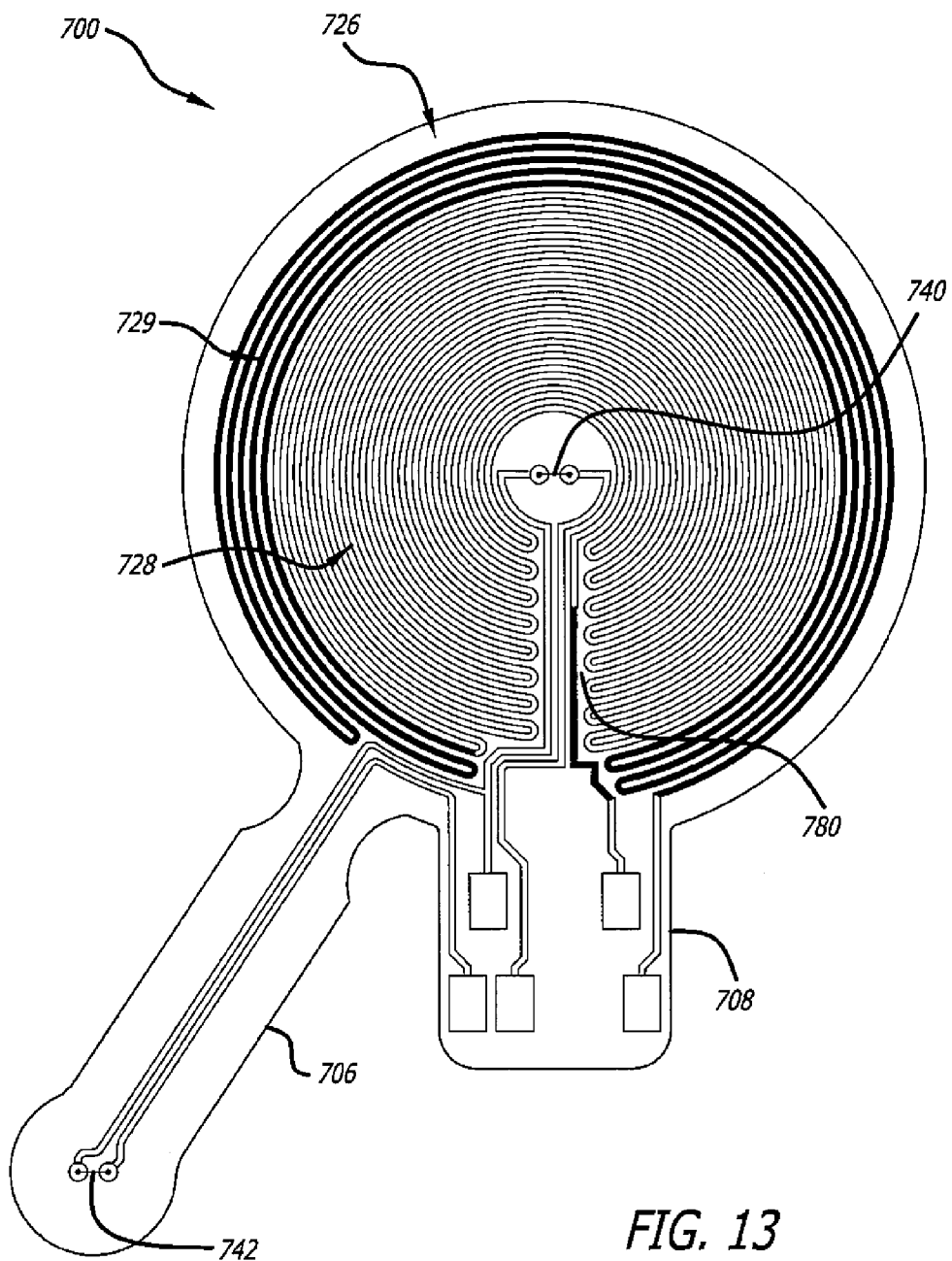
FIG. 13 illustrates a fifth construction of the zero-heat-flux DTT measurement device construction of FIG. 7.

In a fourth construction of the measurement device 700, illustrated in FIG. 12, the electronic circuit device 770 is included, but no slits are provided in the substrate 701, and so the heater 726 includes continuous central and peripheral portions 728 and 729 with different power densities. Six electrical pads having the same connections as shown in FIGS. 8A and 8B are provided on the tab 708. In a fifth construction of the measurement device 700, illustrated in FIG. 13, the electronic circuit device is not included, the heater 726 includes central and peripheral portions 728 and 729 with different power densities, and no slits are provided in the substrate 701. Five electrical pads having the same connections as shown in FIG. 10 are provided on the tab 708. The fifth construction can be further simplified to provide four electrical pads as per the third construction illustrated in FIG. 11 by sharing an electrical pad so as to provide a common reference signal for the first and second thermal sensors 740 and 742 and the heater. In the fourth and fifth constructions, the heater 726 is not penetrated by nonpowered slit areas; therefore, to maximize temperature uniformity, only the long aisle 780 need be powered.

Figure 14:
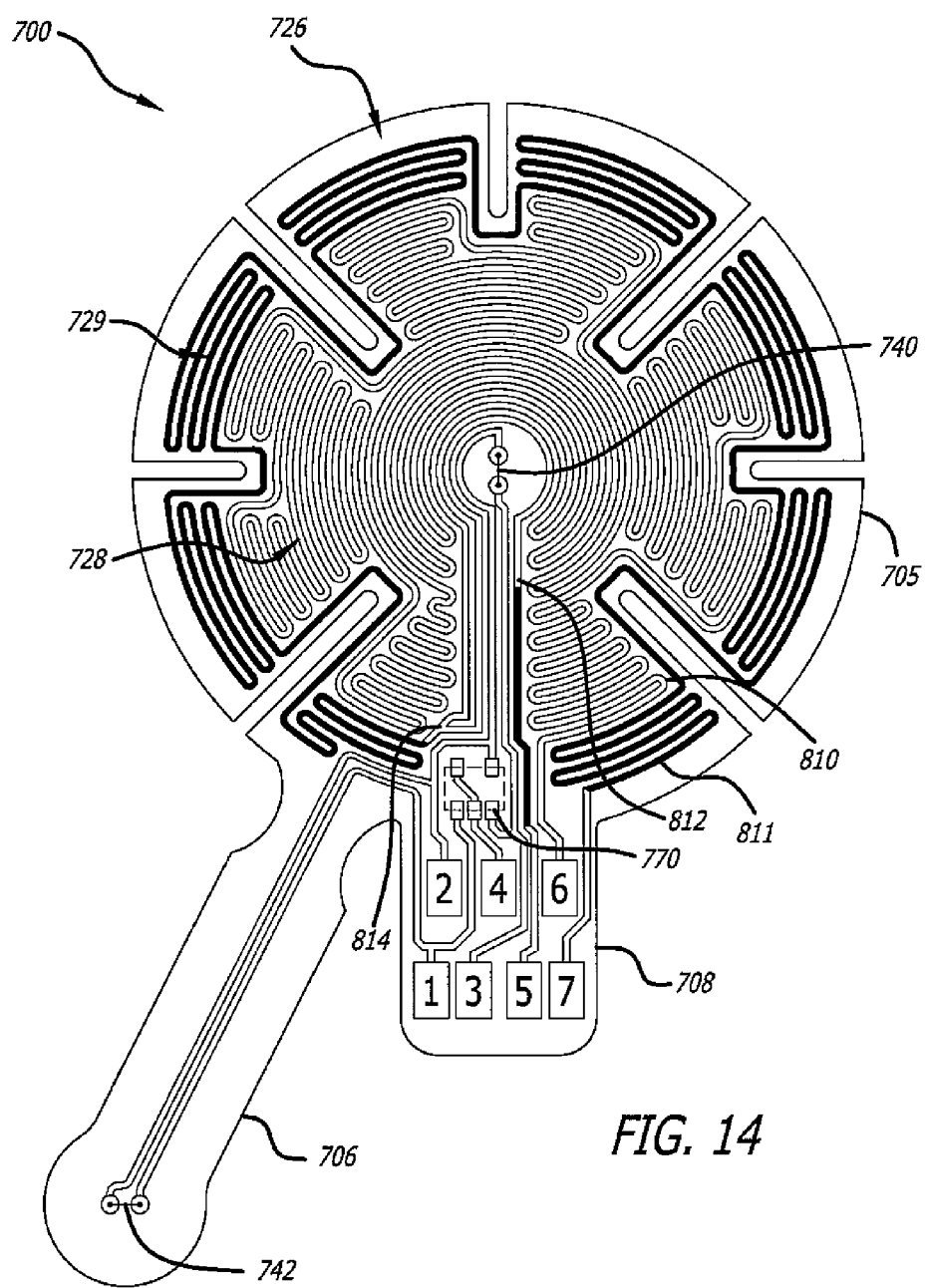
FIG. 14 illustrates a sixth construction of the zero-heat-flux DTT measurement device construction of FIG. 7.
Figure 15:
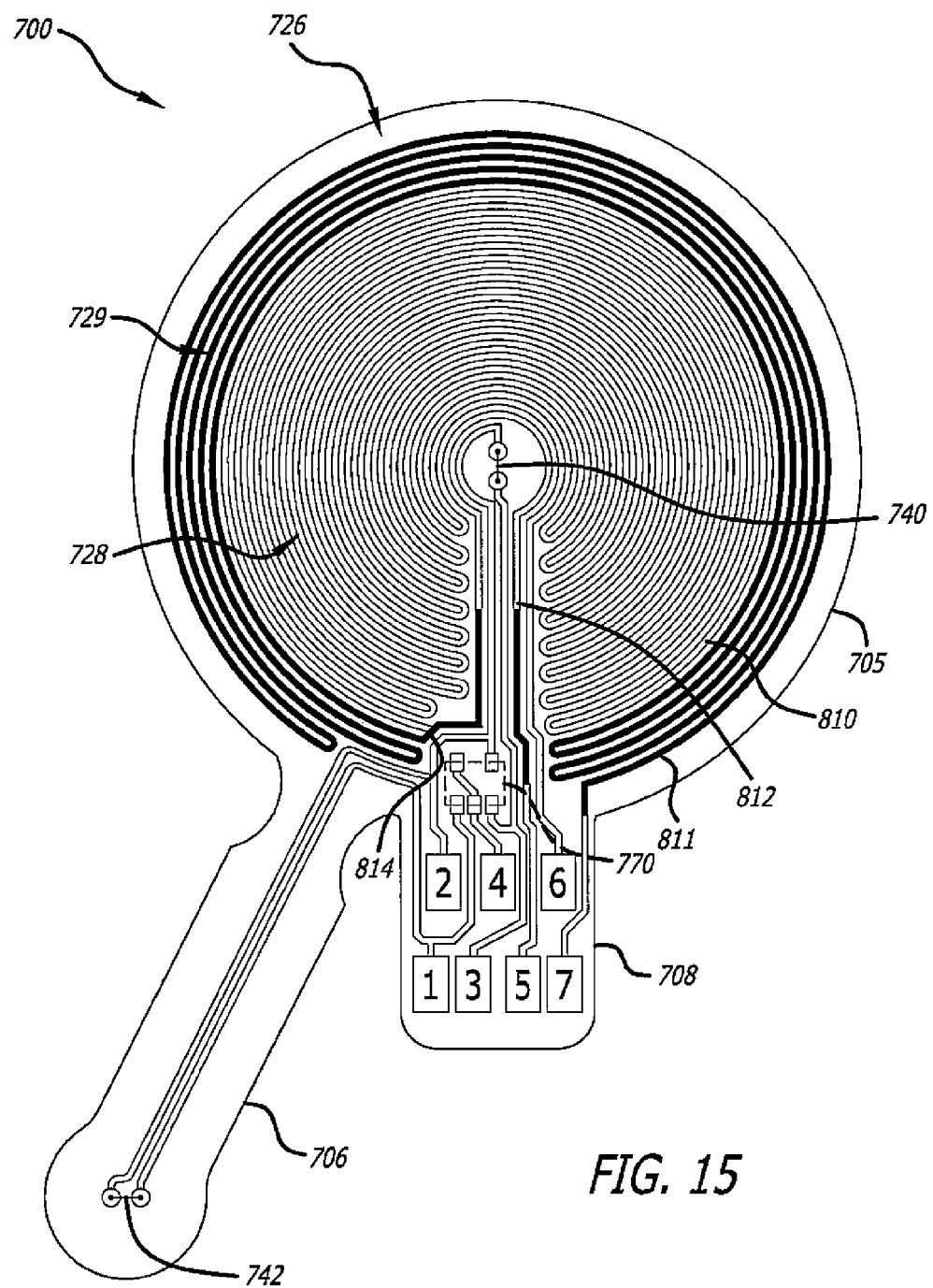
FIG. 15 illustrates a seventh construction of the zero-heat-flux DTT measurement device construction of FIG. 7.

In sixth and seventh constructions of the measurement device 700, illustrated in FIGS. 14 and 15, respectively, the heater trace 726 includes three traces: a first trace 810 that defines the central heater portion 728, a second trace 811, surrounding the first trace 810, that defines the peripheral heater portion 729, and a third trace 812 connected to the first and second traces at a shared node 814. The third trace 812 serves as a common connection between the first and second traces. This heater construction is thus constituted of independently-controlled central and peripheral heater portions that share a common lead. Alternatively, the construction can be considered as a heater with two heater elements. The power densities of the central and peripheral portions can be uniform or nonuniform. If the power densities of the two portions are uniform, the peripheral portion can be driven at a higher power level than the central portion so as to provide the desired higher power density. As per FIGS. 8B, 9, 14, and 15 the second heater construction requires three separate pins (6, 7, and 5) for the first, second, and third traces. Thus, for a construction of the electrical circuit that includes two independently-controlled heater portions that share a common lead, and a memory device, seven electrical pads are provided on the tab 708. As with the first heater construction, the heaters of the second heater construction are entirely electrically isolated from the other elements of the electrical circuit. In this regard, with reference to FIGS. 9 and 14, the heater trace 726 includes three terminal ends and a first electrical pad (electrical pad 5, for example) of the plurality of electrical pads is connected only to a first terminal end of the heater trace, a second electrical pad (electrical pad 6, for example) of the plurality of electrical pads is connected only to the second terminal end of the heater trace, and a third electrical pad (electrical pad 7, for example) of the plurality of electrical pads is connected only to the third terminal end of the heater trace.

Figure 16:
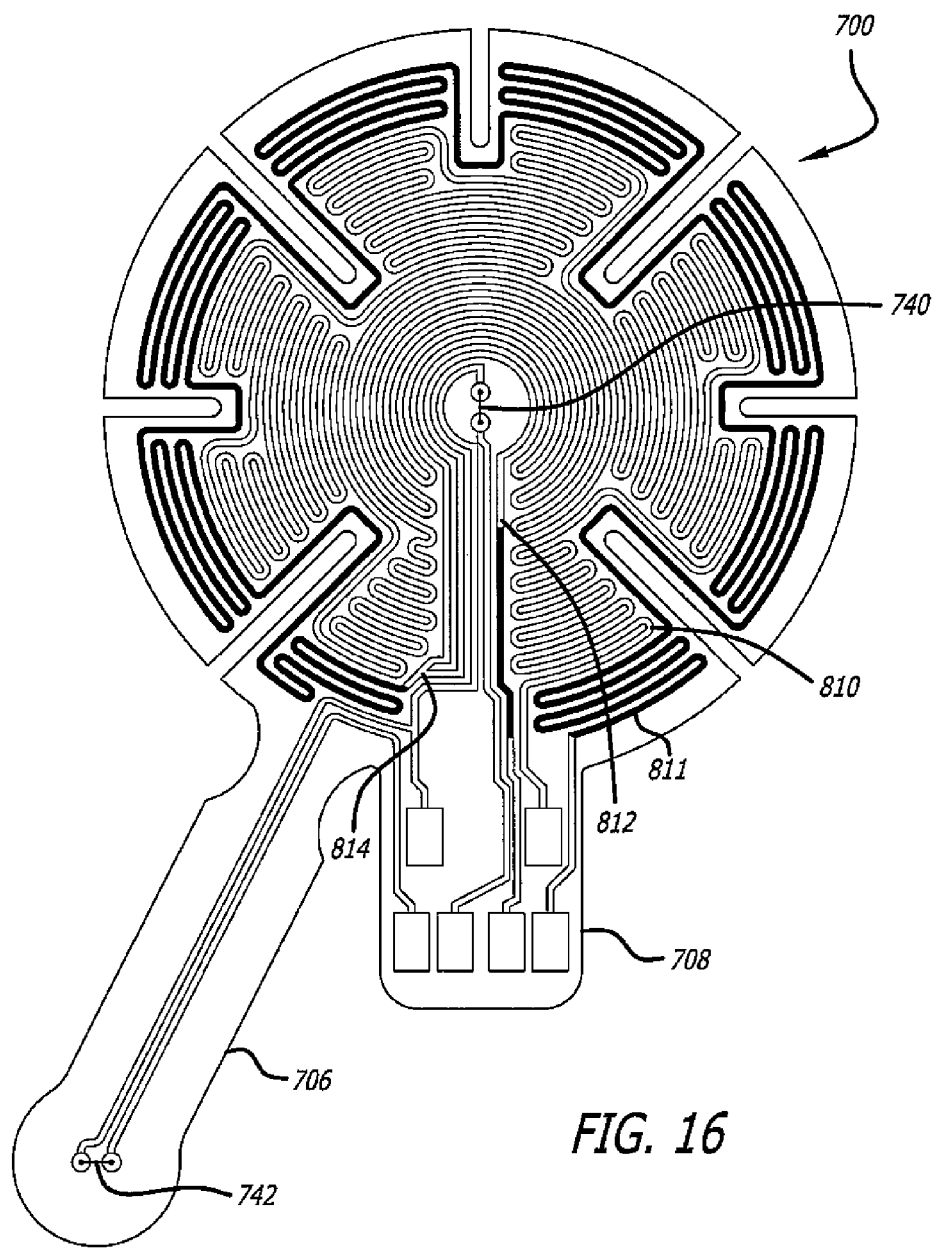
FIG. 16 illustrates an eighth construction of the zero-heat-flux DTT measurement device construction of FIG. 7.

In an eighth construction of the measurement device 700 including a heater 726 with two heater elements as per FIG. 16, elimination of the memory device reduces the electrical pin count to six, if an electrical pad is shared to provide a common reference signal for the first and second thermal sensors; sharing an electrical pad so as to provide a common reference signal for the thermal sensors and the heaters permits the electrical pad count to be reduced to five.

Figure 17:
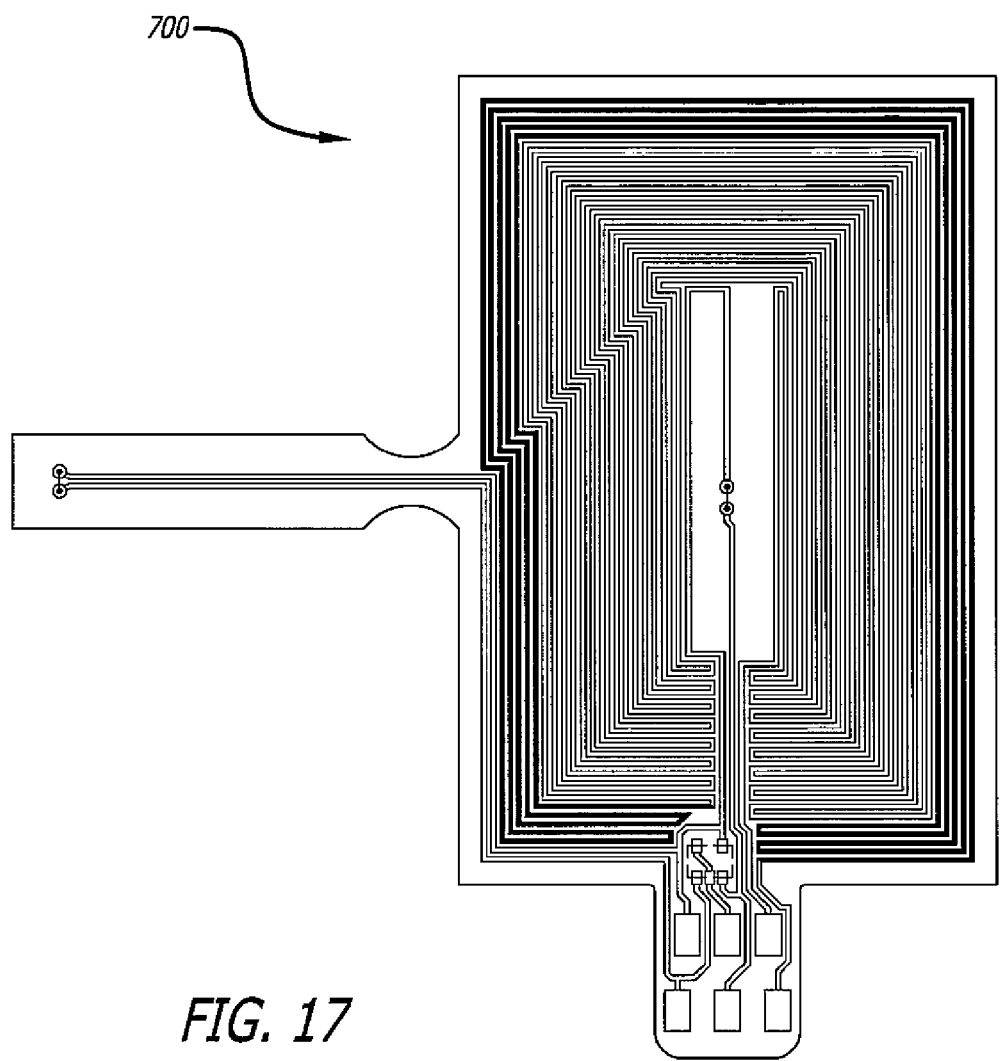
FIG. 17 illustrates a ninth construction of the zero-heat-flux DTT measurement device construction of FIG. 7.
Figure 18:
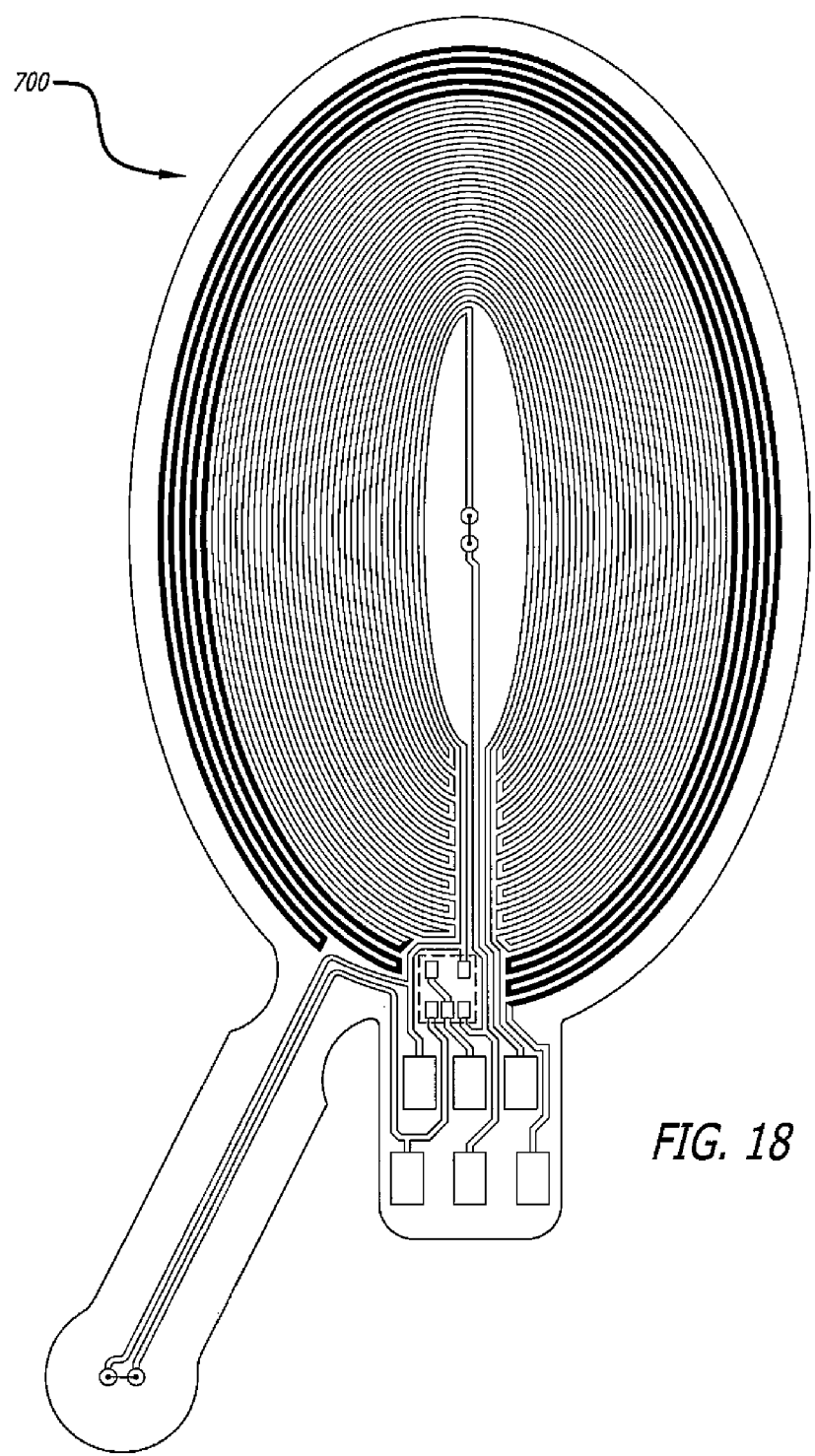
FIG. 18 illustrates a tenth construction of the zero-heat-flux DTT measurement device construction of FIG. 7

It is not necessary that the flexible substrate be configured with a circular central section, nor is it necessary that the annular heater be generally circular. In ninth and tenth constructions of the measurement device 700, illustrated in FIGS. 17 and 18, respectively, the central substrate sections have multilateral and oval (or elliptical) shapes, as do the heaters. Each heater construction includes central and peripheral power density portions and a nonpowered central zone surrounded by the heater. All of the constructions previously described can be adapted to these shapes as required by design, operational, or manufacturing considerations.

Although principles of temperature measurement device construction and manufacture have been described with reference to presently preferred embodiments, it should be understood that various modifications can be made without departing from the spirit of the described principles. Accordingly, the principles are limited only by the following claims.

The invention claimed is:

1. A zero-heat-flux temperature device with first and second flexible substrate layers sandwiching a layer of thermally insulating material, in which a heater trace disposed on the first substrate layer defines a heater including a central power density portion surrounding a zone of the first substrate layer having no heater trace and a peripheral power density portion surrounding the central power density portion, a first thermal sensor is disposed in the zone, a second thermal sensor is disposed on the second substrate layer, a plurality of connection pads is disposed outside of the heater trace, and a plurality of conductive traces connects the first and second thermal sensors and the heater trace with the plurality of connection pads.

2. The zero-heat-flux temperature device of claim 1, in which the flexible substrate includes a center section, a tab extending outwardly from the periphery of the center section, and a tail extending outwardly from the periphery of the center section, the plurality of connection pads is disposed on the tab, and the center section and the tail are folded around the layer of thermal insulating material such that the center section constitutes the first substrate layer and the tail constitutes the second substrate layer.

3. The zero-heat-flux temperature device of claim 2, in which the central power density portion has a first power density and the peripheral power density portion has a second power density that is greater than the first power density.

4. The zero-heat-flux temperature device of claim 3, in which the central power density portion has an annular shape and the peripheral power density portion has an annular shape that is concentric with the central power density portion annular shape.

5. The zero-heat-flux temperature device of claim 3, further comprising a pattern of slits in the center section extending from the periphery of the center section toward the zone, in which the heater trace includes portions flanking the slits with a power density that is greater than the first power density.

6. The zero-heat-flux temperature device of claim 3, further comprising a bulbous enlargement at the end of the tail in which the second thermal sensor is disposed.

7. The zero-heat-flux temperature device of claim 3, in which the heater trace includes two terminal ends and a first connection pad of the plurality of connection pads is connected only to a first terminal end of the heater trace and a second connection pad of the plurality of connection pads is connected only to the second terminal end of the heater trace.

8. The zero-heat-flux temperature device of claim 2, in which the center section has a substantially circular shape and the tail and tab are separated by an arc of less than or equal to 1800 on the periphery of the center section.

9. The zero-heat-flux temperature device of claim 8, in which the plurality of connection pads includes at least four connection pads.

10. The zero-heat-flux temperature device of claim 9, in which the tab includes opposing notches.

11. The zero-heat-flux temperature device of claim 1, in which the central power density portion includes a first heater trace portion, the peripheral power density portion includes a second heater trace portion separate from the first heater trace portion, and the heater trace further includes a common heater trace portion separate from the first and second heater trace portions and connected at a shared node to the first and second heater trace portions.

12. The zero-heat-flux temperature device of claim 11, in which the central power density portion has an annular shape and the peripheral power density portion has an annular shape that is concentric with the central power density portion annular shape.

13. The zero-heat-flux temperature device of claim 12, further comprising a pattern of slits in the center section extending from the periphery of the center section toward the zone, in which the second heater trace portion includes elongate portions flanking the slits.

14. The zero-heat-flux temperature device of claim 11, in which the heater trace includes three terminal ends and a first connection pad of the plurality of connection pads is connected only to a first terminal end of the heater trace, a second connection pad of the plurality of connection pads is connected only to the second terminal end of the heater trace, and a third connection pad of the plurality of connection pads is connected only to the third terminal end of the heater trace.

15. The zero-heat-flux temperature device of claim 1, further comprising a pattern of slits in the center section extending from the periphery of the center section toward the zone in which the heater trace includes elongate portions flanking the slits.

16. A temperature device, comprising:
a flexible substrate; and,
an electrical circuit on the flexible substrate, the electrical circuit including an annular heater trace surrounding a zone of the flexible substrate, a first thermal sensor disposed in the zone, a second thermal sensor disposed outside of the annular heater trace, a multi-pin electronic circuit device, a plurality of connection pads disposed outside of the annular heater trace, and a plurality of conductive traces connecting the first and second thermal sensors, the multi-pin electronic circuit device, and the heater trace with the plurality of connection pads.

17. The temperature device of claim 16, in which the annular heater trace includes a central heater portion having a first power density and a peripheral heater portion having a second power density that is greater than the first power density.

18. The temperature device of claim 17, in which the plurality of connection pads includes six connection pads.

19. The temperature device of claim 18, in which the multi-pin electronic circuit device is a programmable memory device.

20. The temperature device of claim 16, in which the annular heater trace includes a central heater portion including a first heater trace portion, a peripheral heater portion including a second heater trace portion separate from the first trace portion, and a common heater trace portion separate from the first and second heater trace portions and connected at a shared node to the first and second heater trace portions.

21. The temperature device of claim 20, in which the plurality of connection pads includes seven connection pads.

22. The temperature device of claim 21, in which the multi-pin electronic circuit device is a programmable memory device.

* * * * *